United States Patent
Hoff et al.

(10) Patent No.: US 10,474,657 B2
(45) Date of Patent: Nov. 12, 2019

(54) AUGMENTING RELATIONAL DATABASES VIA DATABASE STRUCTURE GRAPH

(71) Applicant: SAP SE, Walldorf (DE)

(72) Inventors: Roland Hoff, Walldorf (DE); Thomas Ploski, Bad Schoenborn (DE)

(73) Assignee: SAP SE, Walldorf (DE)

( * ) Notice: Subject to any disclaimer, the term of this patent is extended or adjusted under 35 U.S.C. 154(b) by 269 days.

(21) Appl. No.: 15/703,750

(22) Filed: Sep. 13, 2017

(65) Prior Publication Data

US 2018/0150495 A1    May 31, 2018

Related U.S. Application Data

(60) Provisional application No. 62/426,408, filed on Nov. 25, 2016.

(51) Int. Cl.
| | |
|---|---|
| *G06F 16/22* | (2019.01) |
| *G06F 16/28* | (2019.01) |
| *G06F 16/901* | (2019.01) |
| *G06F 16/21* | (2019.01) |

(52) U.S. Cl.
CPC ........ *G06F 16/2282* (2019.01); *G06F 16/213* (2019.01); *G06F 16/285* (2019.01); *G06F 16/288* (2019.01); *G06F 16/289* (2019.01); *G06F 16/9024* (2019.01)

(58) Field of Classification Search
CPC ... G06F 16/213; G06F 16/2282; G06F 16/288
See application file for complete search history.

(56) References Cited

U.S. PATENT DOCUMENTS

| | | | |
|---|---|---|---|
| 2009/0259618 A1* | 10/2009 | Shi | G06F 16/2282 |
| 2016/0179883 A1* | 6/2016 | Chen | G06F 16/24528 707/714 |
| 2019/0179832 A1* | 6/2019 | Nam | G06F 16/278 |

OTHER PUBLICATIONS

"Entity Copier—Reference Guide for the Pension Fund—SAP Library," *SAP*, https://help.sap.com/erp_hcm_ias_2013_01/helpdata/en/32/cae73ea87c11d1a1dd080009b433a9/frameset.htm, retrieved Nov. 23, 2016, 1 page.

"Employee Attributes," *SAP*, https://archive.sap.com/discussions/thread/1336770, retrieved Nov. 23, 2016, 6 pages.

(Continued)

*Primary Examiner* — William Spieler
(74) *Attorney, Agent, or Firm* — Klarquist Sparkman, LLP

(57) ABSTRACT

Methods and apparatus are disclosed for supporting the addition of new instances of database objects and relationships, for a relational database environment that can be partially represented as a graph of fields (columns) of database tables. For a new instance of a graph element (node or edge) to be spawned, the element is classified into one of several use cases. Each database table is analyzed based on its key and non-key fields, according to use-case-dependent rules, to determine whether it should be augmented with a new entry for the new element instance. If yes, then the database table can be augmented, or can be marked for augmentation upon a subsequent request for a new instance of the graph element. Efficient and reliable growth of large and complex relational databases is enabled. Examples are provided across a wide range of domains. Certain variants are also disclosed.

20 Claims, 22 Drawing Sheets

(56) References Cited

OTHER PUBLICATIONS

"Sites: Exporting and Importing Site Master Data," *SAP*, https://help.sap.com/saphelp_erp60_sp/helpdata/en/39/a3c7536e8e2a4be10000000a174cb4/content.htm, retrieved Nov. 23, 2016, 6 pages.
Ortega, "How to Modify, Create and Delete Table Entries from SE16," *SAP Community Network*, created Jan. 21, 2011, http://www.sdn.sap.com/irj/scn/go/portal/prtroot/docs/library/uuid/e076abe3-6e2c-2e10-b7ab-f1ae650de095?overridelayout=true, retrieved Nov. 23, 2016, 12 pages.
"Maintaining Sanctioned Party Lists Manually," *SAP*, created 2014, https://help.sap.com/saphelp_gts10/helpdata/en/4b/aae7a627b25685e10000000a42189b/content.htm, retrieved Nov. 23, 2016, 4 pages.
"Organizational Management," *SAP HR*, http://saphr.iexpertify.com/category/organizational-management, retrieved Nov. 23, 2016, 17 pages.
"Organizational Management," *SAP HR*, http://saphr.iexpertify.com/category/organizational-management/page/2, retrieved Nov. 23, 2016, 11 pages.
"Copying an Object," *SAP Library*, SAP XI Design and Configuration Time, University of Kentucky Information Technology Services, myhelp.uky.edu, 2005, 1 page.

\* cited by examiner

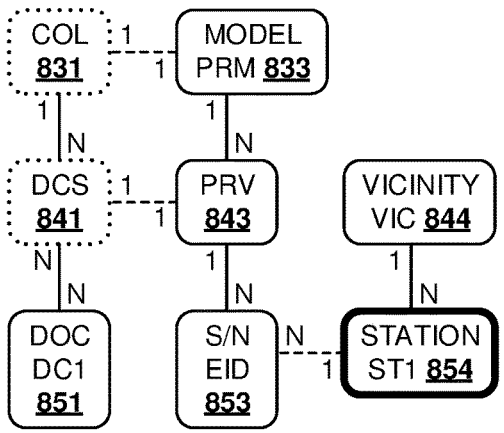
*FIG. 8A*
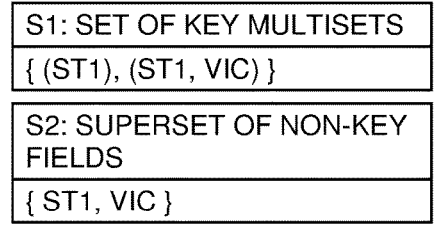
*FIG. 8B*
| KEY<br>ST1 | NON-KEY<br>ZIP CODE | NON-KEY<br>HYPERLINK | |
|---|---|---|---|
| STN_219 | 97204 | HTTP://LINK1 | |
| STN_336 | 02138 | HTTP://LINK2 | |
| STN_1522 | 63105 | HTTP://LINK3 | |
| | | | |
*FIG. 8C*
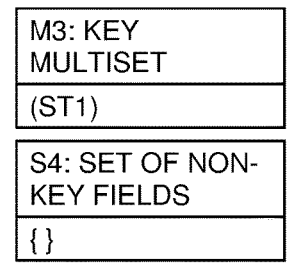
*FIG. 8D*
| KEY<br>ST1 | KEY<br>PRM | NON-KEY<br>DC1 | |
|---|---|---|---|
| STN_219 | TH-336 | D_31799 | |
| STN_219 | TH-337 | D_95377 | |
| STN_1522 | TH-337 | D_95377 | |
| | | | |
*FIG. 8E*
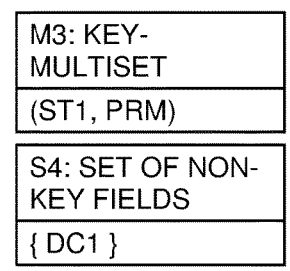
*FIG. 8F*

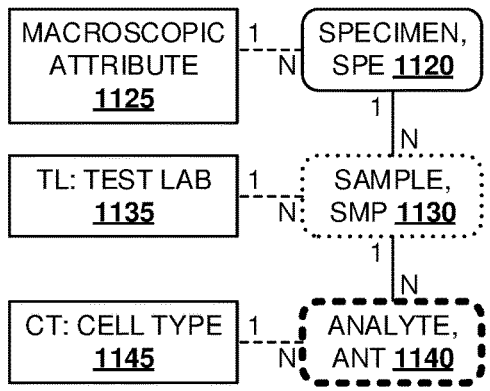

FIG. 11A

| S1: SET OF KEY MULTISETS |
| --- |
| { (CT, SPE, TL) } |

| S1+: SET OF KEY MULTISETS |
| --- |
| { (CT, SPE, TL), (CT, SPE) } |

| S2: SUPERSET OF NON-KEY FIELDS |
| --- |
| { CT, SPE, TL } |

FIG. 11B

| KEY CT | KEY SPE | NON-KEY COMMENT | |
| --- | --- | --- | --- |
| ERYTHROCYTE | ALICE | Abcd | |
| MYOCYTE | BOB | Efgh | |
| MYOCYTE | BOB | Jklm | |
| | | | |

FIG. 11C

| M3: KEY MULTISET |
| --- |
| (CT, SPE) |

| S4: SET OF NON-KEY FIELDS |
| --- |
| { } |

FIG. 11D

| KEY CT | KEY TL | KEY SPE | NON-KEY CT | |
| --- | --- | --- | --- | --- |
| ERYTHRO-CYTE | BIG_LAB | ALICE | LEUKO-CYTE | |
| MYOCYTE | RED_LAB | BOB | MYOBLAST | |
| MYOCYTE | OLD_LAB | BOB | MYOBLAST | |
| | | | | |

FIG. 11E

| M3: KEY MULTISET |
| --- |
| (CT, SPE, TL) |

| S4: SET OF NON-KEY FIELDS |
| --- |
| { CT } |

FIG. 11F

| S1: SET OF KEY MULTISETS |
|---|
| { (DV1, MOD) } |
| S2: SUPERSET OF NON-KEY FIELDS |
| { DV1, MOD } |

| KEY DV1 | KEY MOD | NON-KEY DATE | |
|---|---|---|---|
| ALICE | INPUT | 1/1/2014 | |
| ALICE | LOGIC | 2/2/2014 | |
| BOB | LOGIC | 3/3/2014 | |
| | | | |

| M3: KEY MULTISET |
|---|
| (DV1, MOD) |
| S4: SET OF NON-KEY FIELDS |
| { } |

| KEY DV1 | NON-KEY DVT | NON-KEY PHONE | |
|---|---|---|---|
| ALICE | DE_1 | 765-4321 | |
| BOB | IN_2 | 876-5432 | |
| CAROL | US_1 | 987-6543 | |
| | | | |

| M3: KEY MULTISET |
|---|
| (DV1) |
| S4: SET OF NON-KEY FIELDS |
| { DVT } |

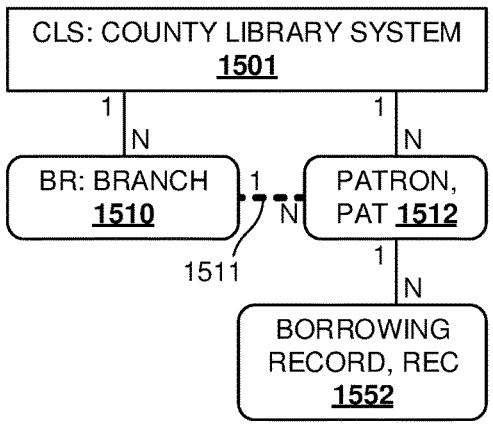
FIG. 15A
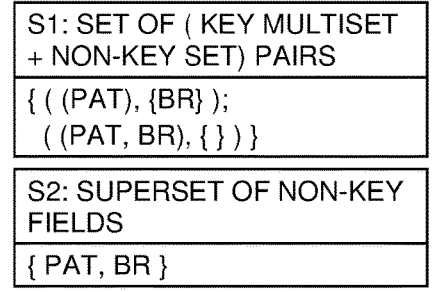
S1: SET OF ( KEY MULTISET + NON-KEY SET) PAIRS
{ ( (PAT), {BR} );
  ( (PAT, BR), { } ) }
S2: SUPERSET OF NON-KEY FIELDS
{ PAT, BR }
FIG. 15B
| KEY PAT | KEY BR | NON-KEY DATE | NON-KEY BR_2 | |
|---|---|---|---|---|
| ALICE | NORTH | 1/1/2011 | EAST | |
| BOB | EAST | 2/2/2012 | – | |
| CAROL | CENTRAL | 3/3/2013 | – | |
| | | | | |
FIG. 15C
| M3: KEY MULTISET |
|---|
| (PAT, BR) |
| S4: SET OF NON-KEY FIELDS |
| { BR } |
FIG. 15D
| KEY PAT | NON-KEY REC | NON-KEY PHONE | |
|---|---|---|---|
| ALICE | R1234 | 765-4321 | |
| BOB | R2345 | 876-5432 | |
| CAROL | R3456 | 987-6543 | |
| | | | |
FIG. 15E
| M3: KEY MULTISET |
|---|
| (PAT) |
| S4: SET OF NON-KEY FIELDS |
| { REC } |
FIG. 15F

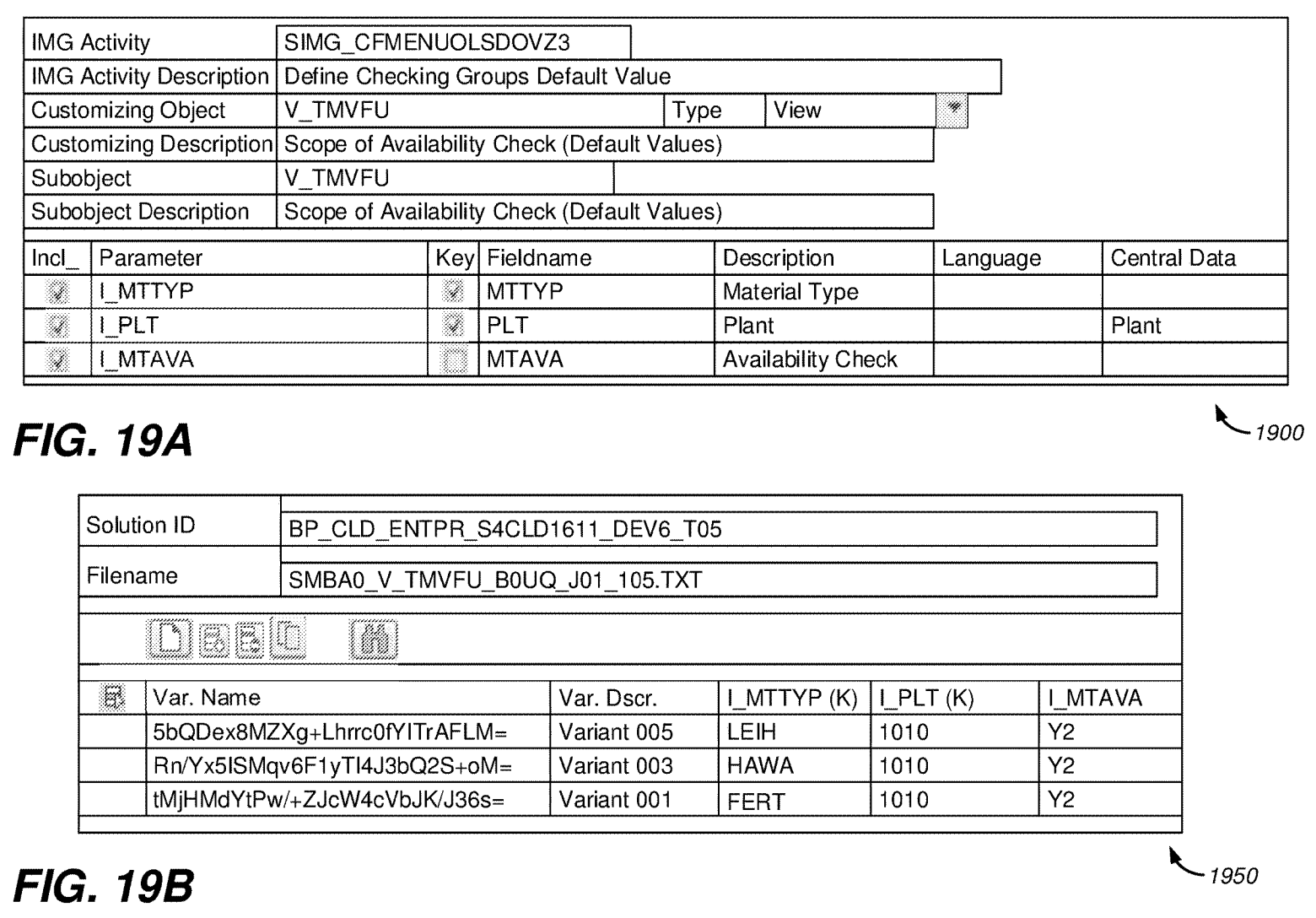

| IMG Activity | SIMG_CFMENUOLSDOVZ3 | | | |
|---|---|---|---|---|
| IMG Activity Description | Define Checking Groups Default Value | | | |
| Customizing Object | V_TMVFU | Type | View | |
| Customizing Description | Scope of Availability Check (Default Values) | | | |
| Subobject | V_TMVFU | | | |
| Subobject Description | Scope of Availability Check (Default Values) | | | |

| Incl. | Parameter | Key | Fieldname | Description | Language | Central Data |
|---|---|---|---|---|---|---|
| * | I_MTTYP | * | MTTYP | Material Type | | |
| * | I_PLT | * | PLT | Plant | | Plant |
| * | I_MTAVA | | MTAVA | Availability Check | | |

*FIG. 19A*

| Solution ID | BP_CLD_ENTPR_S4CLD1611_DEV6_T05 |
|---|---|
| Filename | SMBA0_V_TMVFU_B0UQ_J01_105.TXT |

| | Var. Name | Var. Dscr. | I_MTTYP (K) | I_PLT (K) | I_MTAVA |
|---|---|---|---|---|---|
| | 5bQDex8MZXg+Lhrrc0fYlTrAFLM= | Variant 005 | LEIH | 1010 | Y2 |
| | Rn/Yx5ISMqv6F1yTI4J3bQ2S+oM= | Variant 003 | HAWA | 1010 | Y2 |
| | tMjHMdYtPw/+ZJcW4cVbjK/J36s= | Variant 001 | FERT | 1010 | Y2 |

| IMG Activity | SIMG_CFMENUOLIAOIO6 | | | |
|---|---|---|---|---|
| IMG Activity Description | Maintain Default Values for Control Keys for Order Types | | | |
| Customizing Object | V_T350W_S | Type | View | |
| Customizing Description | Control Key Default | | | |
| Subobject | V_T350W_S | | | |
| Subobject Description | Control Key Default | | | |

| Incl_ | Parameter | Key | Fieldname | Description | Central Data |
|---|---|---|---|---|---|
| * | I_ORTYP | | ORTYP | Order Type | Order Types |
| * | I_PPLT | ✓ | PPLT | Planning Plant | Plant |
| * | I_APPLN | ✓ | APPLN | Application | |
| | I_CTLKY | | CTLKY | Control Key | |

FIG. 20B — 2050

| Solution ID | BP_CLD_ENTPR_S4CLD1611_DEV6_T05 |
|---|---|
| Filename | V_T350W_S_V_T350W_S_BFJ.TXT |

| | Var. Dscr. | Var. Name | I_ORTYP (K) | I_PPLT (K) | I_APPLN | I_CTLKY |
|---|---|---|---|---|---|---|
| | VAR0001 | gUUiYyS7XK55XohyA9YzP13 | YBA1 | 1010 | * | YBM1 |

| IMG Activity | SIMG_CFMENUOLSDFP4 | | | | | |
|---|---|---|---|---|---|---|
| IMG Activity Description | Define And Assign Pricing Procedures | | | | | |
| Customizing Object | V_T68JV | | Type | View | | |
| Customizing Description | Det. Of Pricing Procedures in Sales Docs. | | | | | |
| Subobject | V_T68JV | | | | | |
| Subobject Description | Det. Of Pricing Procedures in Sales Docs. | | | | | |

| Incl. | Parameter | Key | Fieldname | Description | Language | Central Data |
|---|---|---|---|---|---|---|
| | I_CPRP | ✓ | CPRP | Cust. Pric. Procedure | | Document pricing procedure |
| | I_DPRP | ✓ | DPRP | Doc. Pricing Proc. | | Division |
| | I_DIV | ✓ | DIV | Division | | Sales Organization |
| | I_SOR | ✓ | SOR | Sales Organization | | Distribution Channel |
| | I_DCHL | ✓ | DCHL | Distribution Channel | | Costing Sheet |
| | I_PRPR | | PRPR | Pricing Procedure | | |
| | I_CTFE | | CTFE | Condition Type for Fast Entry | | |

| Solution ID | BP_CLD_ENTPR_S4CLD1611_DEV6_T05 | | | | | | |
|---|---|---|---|---|---|---|---|
| Filename | V_T683V_V_T683V_J71.TXT | | | | | | |

| Var. Name | Var. Dscr. | I_CPRP (K) | I_DPRP (K) | I_DIV (K) | I_SOR (K) | I_DCHL (K) | I_PRPR | I_CTFE |
|---|---|---|---|---|---|---|---|---|
| R+yAxZX | 1010/10/00/S/"" | | S | 00 | 1010 | 10 | A10001 | PMP0 |
| V+YT9pgz | 1010/10/00/S/01 | 01 | S | 00 | 1010 | 10 | A10001 | PMP0 |

| IMG Activity | SIMG_CFMENUSAPCOVXA | | | |
|---|---|---|---|---|
| IMG Activity Description | Assign division to sales organization | | | |
| Customizing Object | V_TVKOS_ASSIGN | | Type | View |
| Customizing Description | Assignment Sales Organization - Division | | | |
| Subobject | V_TVKOS_ASSIGN | | | |
| Subobject Description | Assignment Sales Organization - Division | | | |

| Incl_ | Parameter | Key | Fieldname | Description | Language | Central Data |
|---|---|---|---|---|---|---|
| | I_DIV | ✓ | DIV | Division | | Division |
| | I_SOR | ✓ | SOR | Sales Organization | | Sales Organization |

| Solution ID | BP_CLD_ENTPR_S4CLD1611_DEV6_T05 | | |
|---|---|---|---|
| Filename | SMBA0_TVKOS_B1R3_J01_101.TXT | | |

| Var. Name | Var. Dscr. | I_DIV (K) | I_SOR (K) |
|---|---|---|---|
| QZasCuGmF+81b | Variant 001 | 00 | 1010 |

AUGMENTING RELATIONAL DATABASES VIA DATABASE STRUCTURE GRAPH

CROSS-REFERENCE TO RELATED APPLICATIONS

This application claims the benefit of U.S. Provisional Application No. 62/426,408, entitled "COPY CONTROL IN DATA NETWORKS," filed Nov. 25, 2016, which is incorporated by reference herein in its entirety.

BACKGROUND

Relational databases are widely used in diverse fields. Over the course of the lifetime of the database environment, it may be necessary to add entities of pre-existing types or to add new relationships between existing entities. However, in many instances, the numbers of individual tables can be large and the relationships between tables can be complex, and it can be challenging to accurately determine how to augment existing tables to accommodate new instances of entities or relationships. Accordingly, there remains a continuing need for efficient methods to manage relational databases, and particularly to provide automated methods for facilitating growth of the database environment.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In examples, a relational database environment is partly described by a database structure graph. Nodes of the graph represent fields of the relational database environment and edges of the database structure graph represent associations or hierarchical relationships between respective pairs of fields. In a first aspect, the disclosed technologies provide computer-readable media storing instructions for a method of augmenting the relational database environment in response to a received command to spawn a new instance of an existing graph node. Based on a classification of the node, a first target set of one or more key field multisets can be obtained; a second target set of one or more non-key fields can also be obtained. For a first database table of the database environment, a determination can be made that a complete key field multiset of the first database table is a member of the first target set and a complete non-key field set of the first database table is a subset of the second target set. Responsive to this determination, the first database table can be selected for augmentation, and augmented with an entry for the new instance of the existing graph node. In examples, the complete key field multiset and the complete set of non-key fields can be restricted to fields having corresponding nodes in the database structure graph.

In some examples, the node can be classified as a root node, and the first target set can include a singleton key field which corresponds to the node to be spawned. The second target set can include a field which also corresponds to the node to be spawned. In other examples, the node can be classified as a child of a parent node, and the first target set can include a singleton key field corresponding to the node to be spawned and a two-member multiset of key fields corresponding to the node and its parent. The second target set can include fields corresponding to the node and its parent. In further examples, the first or second target sets consist of only the above-mentioned members.

In additional examples, the node can be classified as a logical combination node of a parent node and a second node, and the first target set can include a couple of key fields corresponding to the second node and the parent node. The second target set can include fields corresponding to the second node and the parent node. In still further examples, the node can be classified as a logical combination node of a grandparent node, a second node, and a third node, and the first target set can include a triple of key fields corresponding to these three nodes. The second target set can include fields corresponding to these three nodes.

In some examples, a determination of complete key field multiset or a determination of a complete set of non-key fields is made for each database table of a third set of database tables which includes the first database table. A further determination can be made whether these complete key field multisets are members of the first target set and/or these complete sets of non-key fields are subsets of the second target set. A determination that a complete key field multiset is not a member of the first target set, or a determination that a complete set of non-key fields is not a subset of the second target set can be used to choose that the corresponding database table not be augmented for the new instance of the existing graph node. The third set of database tables can include configuration tables of the relational database environment.

In another aspect, the disclosed technologies provide computer-readable media storing instructions for a method of augmenting the relational database environment in response to a received command to spawn a new instance of an existing graph edge. Based on a classification of the edge, a first target set of one or more key field multisets can be obtained; a second target set of one or more non-key fields can also be obtained. For a first database table of the database environment, a determination can be made that a complete key field multiset of the first database table satisfies a condition relative to the first target set and a complete non-key field set of the first database table is a subset of the second target set. Responsive to this determination, the first database table can be selected for augmentation, and augmented with an entry for the new instance of the existing graph edge.

In some examples, the edge can be classified as an N:N relationship between first and second nodes, and the first target set can include a couple of key fields corresponding to the first and second nodes. The second target set can include fields corresponding to the first and second nodes. The condition can include that the complete key field multiset is a member of the first target set.

In other examples, the edge can be classified as joining a first node on a "1" side and a second node on an "N" side of a 1:N relationship, and the first target set can include a first pair and a second pair, wherein the first pair includes a singleton key field of the second node and a non-key field set of the first node. The second target pair can include a couple of key fields corresponding to the first and second nodes, and an empty set (of non-key fields). The second target set can include fields of the first and second nodes. The condition can include that there exists a pair of the first target set having a multiset member that is the complete key field multiset of the first database table and having a set member that is a subset of the complete set of non-key fields of the first database table. In further examples, the first target set or the second target set consist of only the above-mentioned components.

In some examples, a determination of complete key field multiset or a determination of a complete set of non-key fields is made for each database table of a third set of database tables which includes the first database table. A further determination can be made whether these complete key field multisets satisfy the condition relative to the first target set and/or these complete sets of non-key fields are subsets of the second target set. A determination that a complete key field multiset does not satisfy the condition relative to the first target set, or a determination that a complete set of non-key fields is not a subset of the second target set can be used to choose that the corresponding database table not be augmented for the new instance of the existing graph edge.

In a further aspect, the disclosed technologies provide a method of augmenting the relational database environment in response to a received command to spawn a new instance of an existing graph node. Based on a classification of the node, a first target set of key field multisets can be obtained; a second target set of one or more non-key fields can also be obtained. The first target set can consist of a singleton multiset corresponding to the node, and optionally a two-member multiset of the node and its parent. The second target set can consist of a field corresponding to the node, and optionally a field corresponding to the node's parent. A third set of a plurality of database tables of the relational database environment can be evaluated to determine a complete key field multiset and a complete non-key field set for each of the database tables, both of which can be restricted to fields having corresponding nodes in the database structure graph. Based on determining whether the complete key field multiset is a member of the first target set and the complete non-key field set is a subset of the second target set, the method can switch between augmenting the instant database table with a new entry for the new instance of the node, or not augmenting the instant database table.

For a first database table of the database environment, a determination can be made that a complete key field multiset of the first database table satisfies a condition relative to the first target set and a complete non-key field set of the first database table is a subset of the second target set. Responsive to this determination, the first database table can be selected for augmentation, and augmented with an entry for the new instance of the existing graph edge.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

BRIEF DESCRIPTION OF FIGURES

FIGS. 8A-8F depict a second example use case, for spawning a child node of an existing parent node, according to disclosed technologies.

FIGS. 11A-11F depict a third example use case, for spawning a logical combination node, according to disclosed technologies.

FIGS. 15A-15F depict a fifth example use case, for spawning a 1:N (one-to-many) association between two nodes, according to disclosed technologies.

FIGS. 19A-19B are diagrams of software interfaces illustrating a database table configured according to disclosed technology.

FIGS. 20A-20B are diagrams of software interfaces illustrating another database table configured according to disclosed technology.

FIGS. 21A-21B are diagrams of a software interface illustrating a further database table configured according to disclosed technology.

FIGS. 22A-22B are diagrams of a software interface illustrating an additional database table configured according to disclosed technology.

DETAILED DESCRIPTION

Overview

Figure 1:
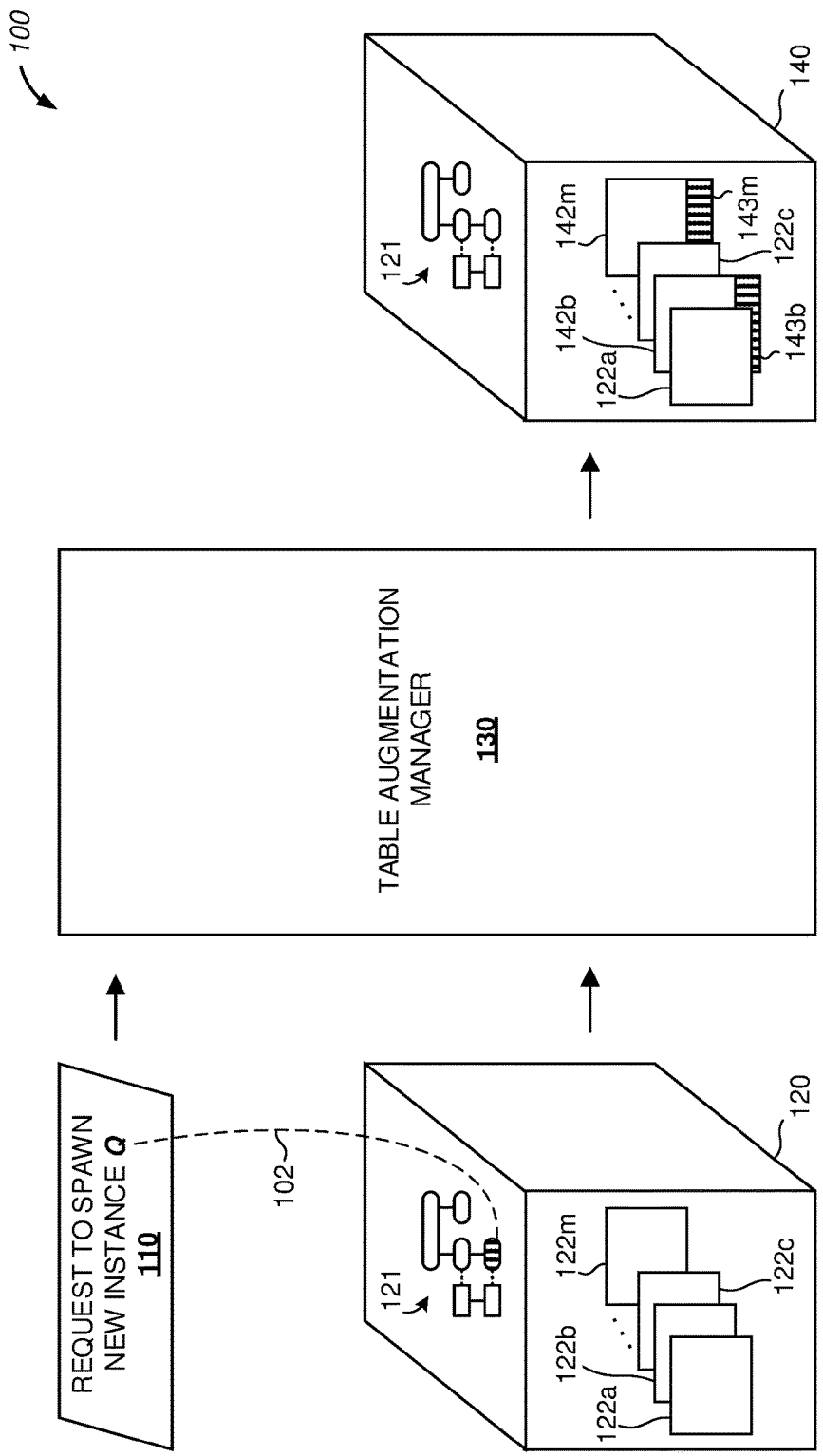
FIG. 1 depicts an example system spawning a new instance of a database graph node according to disclosed technologies.

The relational database environment can be partly represented by or based upon a graph comprising a plurality of edges connecting a plurality of nodes. Thus, the graph can refer to various elements of the database, such as key fields and the like. For example, nodes of the graph can represent database fields, column labels, or classes of entities. Actual instances or values of the database fields, the column entries, or the database entities (e.g., a particular value for a particular field) need not be represented in the graph. Instead, the graph can represent the structure (e.g., dependencies and other relationships) of the database and is therefore sometimes called a "database structure graph." The edges can represent associations or relationships between the nodes of the graph (e.g., for a corresponding relationship between fields of database tables), and can have associated cardinality, such as 1:1, 1:N, 0,1:0,N, or N:N (e.g., for a particular dependency between database tables representing respective real-world entities, such a dependency can be represented in the database structure graph via edges). Such a graph provides a useful representation of the structure of entities in a database environment, without being encumbered with the very large number of instances and varying cardinalities that can commonly be encountered in large databases. Because the database structure graph represents fields (columns) of a relational database environment but not individual database tables or their records, the database structure can partially represent the relational database environment but may not represent the relational database environment fully. The disclosed technologies provide rules for augmentation of database tables as new instances of nodes are spawned, based on the simplified representation of a database structure graph.

The relational database environment also includes a plurality of database tables which can be considered to be organized in rows and columns. For purposes of discussion, each row can correspond to a record of the table, and contains values for one or more fields. The fields can be organized in columns, so that values in a particular column correspond to the same field for the respective records. Thus a field represents a parameter, property, or attribute of the database entities that are represented by the records. A database table can have two columns representing the same parameter; thus a given field can occur multiple times in a table. The relational database tables can be defined as having some fields which are key fields and other fields which are non-key fields. In examples, the combination of values of all key fields of a database table can uniquely identify a record in the table. Columnar-based database implementations can also be supported, resulting in similar functionality.

In practice, the database tables can represent real-world entities that have dependencies; such dependencies can be represented by the database structure graph. For example, if a company can have multiple labs, there is a dependency relationship between a company and a lab, and the relationship is represented by a 1:N edge between the database structure nodes representing the database. The underlying database tables "company" and "lab" can have actual values for the individual company and the labs. Thus, the database structure graph can represent dependencies between the underlying database tables, and commands to create a new instance of a node in the database structure graph can account for such dependencies, preserving integrity of the database tables.

Examples in this disclosure can be based on sets or multisets of fields. A set can be an unordered collection of distinct members, while a multiset can be an unordered collection of its members in which duplication is permitted. As usual, sets are denoted using braces "{ }"; to distinguish from these, multisets are denoted with parentheses "( )" Thus, given objects O1, O2, O2, O3, the set of these objects can be expressed as {O2, O1, O3} which is the same as {O1, O3, O2}; and the multiset can be expressed (O2, O1, O3, O2) which is the same as (O1, O2, O2, O3). The term "singleton" refers to a set or multiset having one member, and the terms "couple" and "pair" refer to a multiset having two members, unless otherwise clear from the context. In examples, sets or multisets of fields can be limited to fields represented by nodes in the database graph, or by nodes or edges in the database graph. Particularly, a "complete set of non-key fields" can be all non-key fields of a table that are represented by nodes (or, by nodes or edges) in a graph. A complete multiset of key fields is similar. A complete set or multiset can include zero, one, or multiple members. By way of illustration, if a table has key fields K1, K2, K2, K3, and non-key fields N4, N5, N6, N6, of which K1, K2, N5, and N6 represent nodes of a database graph, then the complete set of non-key fields can be expressed as {N5, N6}, because K1-K3 are not non-key fields, N4 is not a node, and the duplicate fields N6 only occur once in a set; the complete multiset of key fields for this example can be expressed as (K2, K1, K2) because N4-N6 are not key fields, K3 is not a node of the graph, and duplicate fields K2 can be retained in a multiset. Expressions such as "N4 is not a node" or "node K2" are used as a convenient short-hand for "N4 does not represent a node" or "the node represented by field K2."

While key fields can be represented by nodes in the database graph, and nodes in the database graph can represent key fields, neither of these is a requirement. For example, a logical combination node described herein may not be a key field, and a database table could have a key field (such as K3 in the preceding example) that is not a node in the database graph. Thus the relational database environment can also include key- or non-key fields that are not nodes of a database graph: in this sense also, the database graph can partially represent the relational database environment, but may not represent the relational database environment completely.

Instantiation of a new node or edge of a graph is sometimes denoted "copying," "cloning," or "spawning" the node or edge, although words such as "copying" or "cloning" are used merely for convenience of terminology: in practice, the new instance of node or edge is not an exact copy of any pre-existing node or edge instance of the graph. In the underlying database represented by the database structure graph, a database record can be cloned in that some data can be copied from the original ("old") record, while other data is assigned a new value, transforming the original record into a new record. As a result, the database itself is transformed from an original state into an augmented state.

Figure 3:
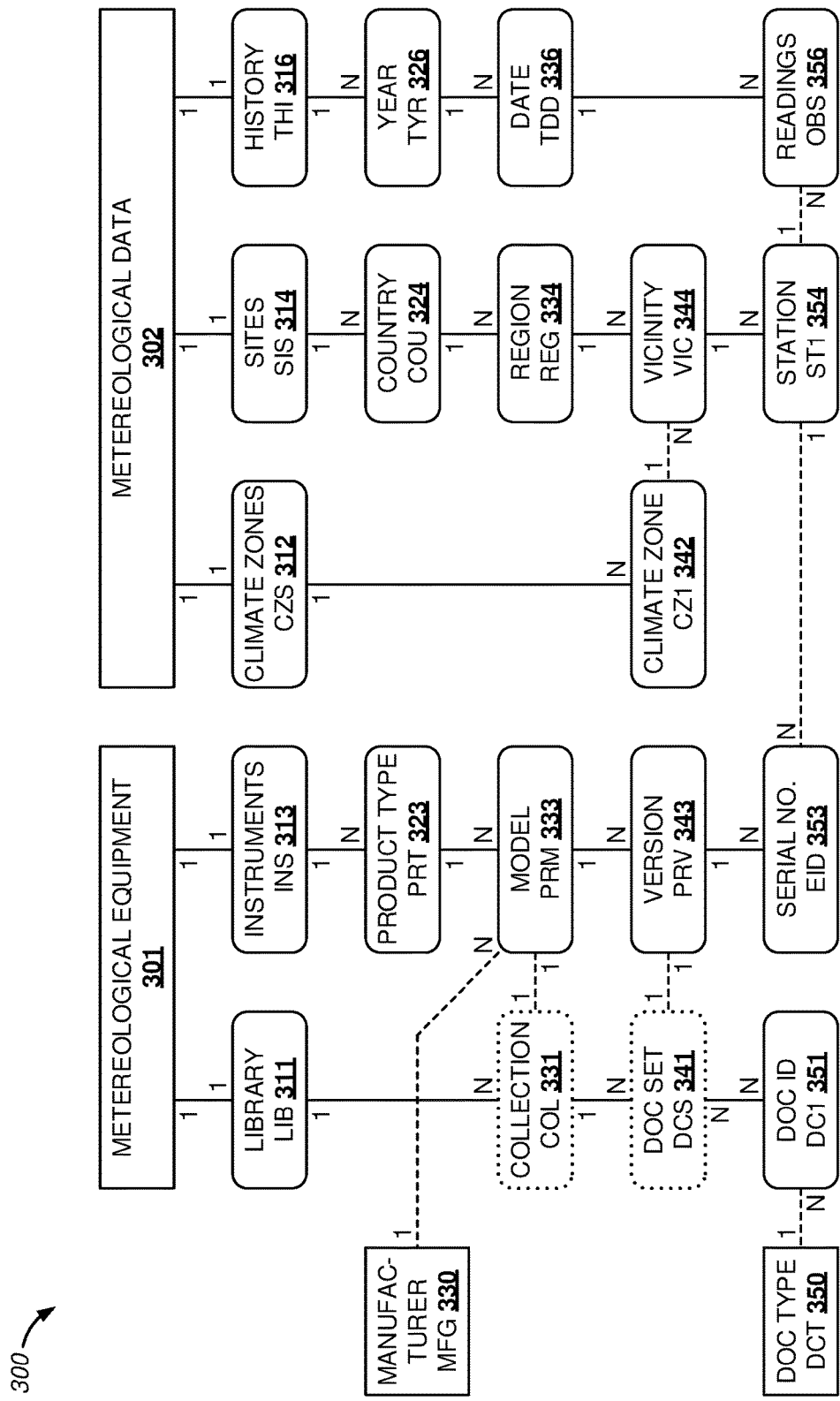
FIG. 3 depicts a graph of an example meteorological database.
Figure 12:
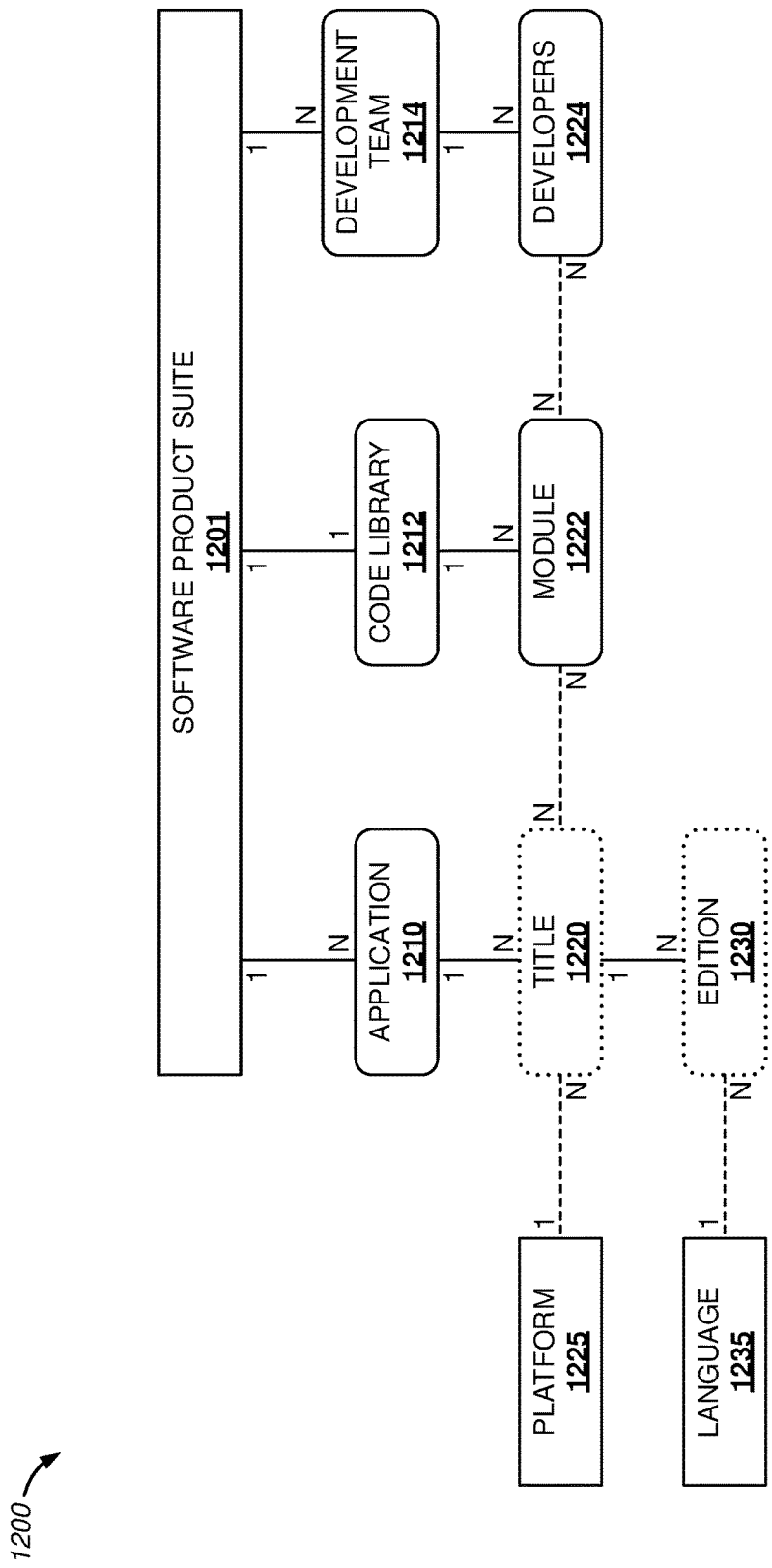
FIG. 12 depicts a graph for a database of a software product suite.

FIGS. 3, 10, 12, 14, and 16 show example graphs for a meteorological database, a gene library database, a software product suite database, a county library database, and a manufacturing company database, respectively, and are described further below. For example, in a meteorological database containing data for thousands of sites, a single graph node can represent the field (or, column label) "Site," which can take on any of the thousands of values for respective sites, in one or more of the relational database tables. These thousands of site values are dubbed "instances" of the "Site" field. A graph edge can represent associations or relationships (including dependencies) between two nodes or fields. Graph edges can have associated cardinality, such as 1:1, 1:N, 0,1:0,N, or N:N. In the example of FIG. 3, the "Station" node 354 can be associated with a parent geographic "Vicinity" 344 and can have relationships with the "Serial Number[s]" 353 of meteorological instruments at each site, and with "Readings" 356 collected at the station. Such examples are 1:N relationships. By way of an illustration, 1000 stations can be distributed among 100 vicinities; then the graph edge between "Station" and "Vicinity" nodes can have 1000 instances connecting each station to its respective parent vicinity. In the example of FIG. 12, code modules 1222 have an N:N relationship with developers 1224. By way of illustration, the number of edges between 1000 code modules and 100 developers can vary widely, from zero (no associations) up to 100,000 (every developer associated with every code module).

Such a database structure graph provides a compact representation of the structure of entities in a database environment, without being encumbered with the very large number of instances and varying cardinalities that can commonly be encountered in large databases. Databases routinely contain thousands or millions of records, with values for up to thousands of fields in each record, and can have a total number of data items up to billions or even trillions. A detailed graph of even a thousand data items can be intractable. However, a graph of just the fields (or, column labels) can be tractable, in the range of tens or low hundreds, even for very large databases. The number of graph nodes can be further reduced by ignoring some fields that have minimal contribution to the database structure. Some ignorable nodes can have a single edge connection. Examples of ignorable nodes can include those representing fields that are only present as non-key fields in tables.

Often, it can be desirable to add a new instance of a node or edge of the graph. Cloning of nodes or edges of the graph can be implemented as part of the growth and life cycle of the relational database environment. To implement the new node or edge instance, new records or entries in one or more database tables can be added. By way of illustration with reference to the library database of FIG. 14, if a new book item 1450 is added to a library collection 1420, certain database tables could need new entries for the new book item 1450. In this disclosure, adding such new records or entries is dubbed "augmenting" the corresponding database table. However, not all database tables may need to be augmented, and in complex graphs it can be problematic to determine which database table(s) to augment for a particular instantiation operation.

In complex database scenarios, the complex dependencies between the tables can be impossible to fathom. Therefore, augmenting the appropriate database tables can be problematic to achieve. These problems in computer technology are addressed by the disclosed technologies. Through the disclosed technologies, database tables can be augmented automatically, consistently, and free of errors. By using the database structure graph in combination with the disclosed augmentation rules, instantiation of a new node or edge in the underlying tables can be achieved. When instantiation of a new node or edge is required, the disclosed technologies can achieve desired results, with a minimum of intervention or configuration of new table entries, to keep the database environment and database applications operating properly. As shown by the range of examples, the disclosed technologies provide improvements to computing technology, particularly to the database art.

The disclosed technologies can provide a copy control mechanism to determine which tables of a relational database environment should be augmented so that the new node/edge instance is properly supported and can operate correctly. The disclosed technologies have been tested and verified in situations where 100 database tables are associated with a graph node to be cloned. Below, several exemplary graphs of database environments are presented and a range of use cases are described.

Example Aspects of Disclosed Technology

In examples of disclosed technologies, a new instance of an object (a node of the graph) or a relationship (an edge of the graph) may need to be created. Generally, this can require creation of new entries in one or more configuration tables of the database environment, but not necessarily in all configuration tables. In a first aspect, the disclosed technologies are directed to determining which configuration tables should be augmented. In a second aspect, the disclosed technologies are directed to augmenting the selected tables.

In another aspect, the prescribed procedures can be used when a new instance is requested, to determine whether each relevant configuration table should be extended to achieve creation of the new instance, and extending configuration tables according to such determination.

In the first aspect, a prescribed procedure is used firstly to classify or characterize, from the graph, the node or edge to be spawned, then secondly to characterize each candidate configuration table of the database environment. By comparing the characterization of a candidate configuration table with the characterization of the node or edge to be spawned, according to a rule, a determination is made whether or not the candidate configuration table should be augmented with a new record representing the node or edge to be spawned. The technologies can operate directly on the database tables in light of a stored network representation of the database and various augmentation rules, which are different from any expert procedure performed by a human.

In examples, a graph-based relational database environment is augmented with a new instance of an existing graph node or edge. Based on a classification of the graph node or edge, a first target set of key field multisets and a second target set of non-key fields can be obtained. Rules or conditions can be evaluated for each of a third set of database tables to determine if each table should be augmented; at least one table of the third set can be augmented if its key field multiset is or is determined to be a member of the first target set, and its set of non-key fields is or is determined to be a subset of the second target set (as used in this disclosure, "A is a subset of B" means A$\subseteq$B, and can include the cases A={ } and A=B). In examples, for each database table of the third set, the corresponding key field multiset and/or the corresponding set of non-key fields can be determined. In examples, for one or more database tables of the third set, either its key field multiset is not or is determined not to be a member of the first target set, or its non-key field set is not or is determined not to be a subset of the second target set, or both, and such a database table is not augmented. In examples, the third set includes configuration tables of the relational database environment.

In a first example use case, a graph node is classified as a root node, which can be a node not having a parent node. The first target set can include or consist of a singleton multiset corresponding to the graph node. The second target set can include or consist of a single element which is a field (or database column label) corresponding to the graph node.

In a second example use case, a graph node is classified as a child node of an existing parent node. The first target set can include or consist of two multisets: a singleton of the child node, and a 2-member multiset of the child node and the parent node. The second target set can include or consist of two members which are respectively fields corresponding to the child node and the parent node.

In a third example use case, a graph node is classified as a combination node of an existing parent node and a second node. The first target set can include or consist of one multiset of the key fields corresponding to the existing parent node and to the second node. The second target set can include or consist of fields corresponding to the existing parent node and to the second node. In examples, either the parent node or the second node (or both) can itself be combination node; in this case this combination node can be replaced by its contributing nodes in the first target set's multiset and in the second target set.

In examples, the graph node can be classified as a combination node of an existing parent node, a second node, and a third node. The first target set can include or consist of one 3-member multiset of the key fields corresponding to the existing parent node, to the second node, and to the third node. The second target set can include or consist of fields respectively corresponding to the existing parent node, to the second node, and to the third node.

In another aspect, a graph-based relational database environment is augmented with a new instance of an existing graph edge. Based on a classification of the graph node or edge, a first target set comprising key field multisets and a second target set of non-key fields can be obtained. One or more rules or conditions are evaluated for database tables to determine whether each database table should be augmented. Responsive at least partially to determining that a key field multiset of a given database table satisfies a condition relative to the first target set and that a set of non-key fields of the first database table is or is determined to be a subset of the second target set, the given database table can be augmented with an entry for the new edge instance. In examples, the corresponding key field multiset and/or the corresponding set of non-key fields (which can be an empty set or can contain a single member) can be determined for each of a plurality of database tables such as configuration database tables.

In examples, the graph edge can be classified as an N:N relationship joining first and second graph nodes. The first target set can include or consist of a couple of the first node and the second node. The second target set can include or consist of fields corresponding to the first and second nodes. The condition to be satisfied can be whether the key field multiset of the given database table is or is determined to be a member of the first target set.

In examples, the graph edge can be classified as an 1:N relationship joining first graph node (on the 1: side) and a second graph node (on the :N side). The first target set can include or consist of one or more pairs, each pair having a key field multiset and a non-key field set. In examples, the first target set can include or consist of two pairs: a first pair that includes or consists of a singleton key field corresponding to the second node and a non-key field set that includes or consists of a non-key field corresponding to the first node; and a second pair that includes or consists of a couple of key fields corresponding to the first and second nodes, and an empty non-key field set. The second target set can include or consist of fields corresponding the first and second nodes. This example can further be applicable to 0,1:N, 1:0,N, or 0,1:0,N relationships. The condition to be satisfied can be that there exists (or there is determined to be) a pair of the first target set having a multiset member that is the key field multiset of the given database table and having a set member that is a subset of the second target set.

In examples, another database table can be found not to satisfy the corresponding condition with respect to the first target set, or can be found not to a have a non-key field set that is a subset of the second target set. This database table is not augmented.

Example System Spawning a New Instance

FIG. 1 is a diagram depicting an example system 100 spawning a new instance of a database graph node according to disclosed technologies. At the outset, database environment 120 is described by database structure graph 121 as disclosed herein, and also includes configuration tables 122a-122m as shown. In practice, many operations can be performed on the database tables 122a-122m without regard to the database structure graph 121. However, the database tables 122a-122m can include a wide variety of configuration tables that require complex maintenance to preserve integrity of the environment 120. The database structure graph 121 can serve to describe the structure of the tables 122a-122m in such a way that relationships between instances of entities represented in the tables 122a-122m are represented in a concrete way as described in the examples herein. As described herein, such relationships can include relationships between fields, dependencies between the tables, and the like.

A request message 110 is received by Table Augmentation Manager 130, the message 110 indicating a request to spawn a new instance Q of a particular node (shown hatched in the graph 121), as indicating by dashed line 102. As shown, the Table Augmentation Manager 130 has access to the database environment 120. Through the disclosed technologies, Table Augmentation Manager 130 determines which among tables 122a-122m are to be augmented for the request 110, and proceeds to add the appropriate augmentation entries. Following this procedure, updated database 140 is obtained, represented by the same graph 121 but containing updated tables. So, while the structure of the database has not changed, a new instance of the database structure graph node has been added to the underlying database tables. As indicated in FIG. 1, some of the tables 142b, 142m are augmented with new entries 143b, 143m, while other tables such as 122a, 122c are unchanged from the corresponding table (such as 122a) in the starting database environment 120.

In practice, the systems shown herein, such as system 100, can vary in complexity, with additional functionality, more complex components, and the like. Additional components can be included to implement security, redundancy, load balancing, auditing, and the like.

The described computing systems can be networked via wired or wireless network connections. Systems can be connected through a global network (e.g., Internet) or an intranet connection (e.g., in a corporate environment, government environment, educational environment, research environment, or the like).

The system 100 and any of the other systems described herein can be implemented in conjunction with any of the hardware components described herein, such as the computing systems described below (e.g., one or more hardware processors, processing units, memory, and the like). In any of the examples herein, the database tables, database structure graph, and the like can be stored in one or more computer-readable storage media or computer-readable storage devices. The technologies described herein can be generic to the specifics of operating systems or hardware and can be applied in any variety of environments to take advantage of the described features.

Example Method of Spawning a New Instance

Figure 2:
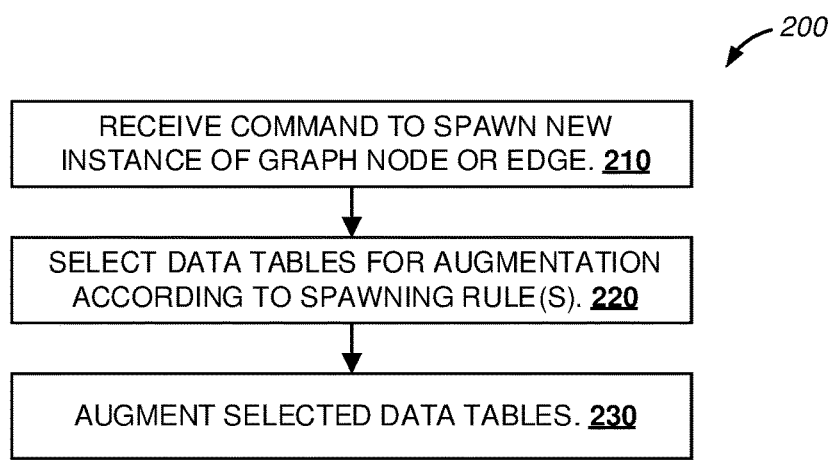
FIG. 2 depicts a flowchart of an example method of spawning a new instance of a database graph node or edge according to disclosed technologies.

FIG. 2 depicts a flowchart of an example method 200 for spawning a new instance of a database graph node or edge according to disclosed technologies. The method 200 can be performed in a relational database environment by a computer-executable Table Augmentation Manager similar to 130 of FIG. 1. At process block 210, a command is received for spawning a new instance of a graph node or edge. The command can be analogous to request message 110 of FIG. 1. At process block 220, data tables are selected for augmentation according to spawning rules. Finally, at process block 230, the selected data tables are augmented according to the command.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

An Example Graph of a Meteorological Database

FIG. 3 depicts a graph 309 of a of an example meteorological database, which mainly consists of two hierarchies, for meteorological equipment, and for meteorological data. This relational database can incorporate a number of related database tables describing various entities pertaining to the meteorological database, such as documents, products, weather stations, collected readings (observational records), and their assorted properties and relationships.

The meteorological equipment hierarchy has a root node 301 for the equipment hierarchy as a whole. Below the root node 301 are a library 311 and an instrument sub-hierarchy 313. The edges from root node 301 to daughter nodes 311, 313 have ends labeled "1" to indicate the cardinality of the relationships being 1:1. In this example, there is just one instance of library 311 and just one instance of instrument sub-hierarchy 313. Some of the nodes in FIG. 3 also have short codes indicated, for example LIB for library 311. In this disclosure, short codes are 2-4 character abbreviations, and are used for convenience to designate graph nodes, instances of graph nodes, or fields.

In this example, the instruments subhierarchy 313 has multiple product types 323; product types 323 could include thermometers, barometers, anemometers, hygrometers, and/or other instruments. In this example, each product type has multiple product models 333, which could be ten different thermometer models, seven different barometers, or five different anemometers. The edges between instruments 313, product type 323, and product model 333 have ends variously labeled "1" and "N" to indicate cardinality of the relationships. The cardinalities can be read as follows: each product type 323 belongs to exactly 1 instrument sub-hierarchy, and the instrument sub-hierarchy 313 can have N product types. N can be any positive integer. Thus, the cardinality also indicates that there can be multiple product types, even though only one node 323 is shown in graph 309. Because of this style of representation, the depicted object can sometimes be referred to as product types 323 or as product type 323, according to the context. These edges are shown with a solid line to indicate a "has a" relationship.

Each product model is also associated with a manufacturer 330. The manufacturer node 330 has no parent, and is regarded as a root node for the purpose of this description, even though it has no children and even though it is not part of the meteorological equipment hierarchy 301. Unlike the edge from product type 323 to product model 313, the edge from manufacturer 320 is shown by dashed line, which indicates an association, different from a "has a" relationship. One of ordinary skill will appreciate that a database and its graph could be organized in different ways: in an alternative example, the product model node 333 could have been implemented as a child of the manufacturer node 330; in a further example, the product model node 333 could have been implemented as a child of two parent nodes.

Each product model 333 can have multiple versions 343; different versions of a product model could vary by e.g. software or firmware updates, or by changes to the components of the product model 333. For each product model version 343, a number of units having respective unique serial numbers 353 can be tracked within the database environment.

The library 311 can be a collection of all documents associated with the various instruments, and can be organized into collections 331 of documents, as indicated by the 1:N relationship shown by the edge joining library 311 with collections 331. Each document collection 331 is also associated with a respective product model 333, as indicated by the 1:1 association relationship between these nodes shown by a dashed line in FIG. 3. Because each collection 331 is uniquely defined by a model (e.g. anemometer model A-77), the collections 331 need not be instantiated as separate fields or columns within the database. Rather, each collection can be represented implicitly by its corresponding Model 333. Accordingly, the Collection 331 is merely a logical combination graph node, shown for convenience of illustration and discussion, and indicated by a dotted outline in FIG. 3.

Within document collection 331 for a given instrument model 333, not all documents are relevant for all versions 343, so sets of documents 341 can be associated with respective versions 343. By way of illustration, a given instrument model 333 can have two versions v1 and v2, sharing a common user manual ("UM") but having different circuit diagrams ("C1" and "C2" respectively). Then, the document set ("Doc Set" for short) 341 for version v1 can include {UM, C1}, while the document set 341 for version v2 can include {UM, C2}. All the documents UM, C1, C2 are part of the document collection for the given instrument model 333. Similar to the collection 331, each document set 341 is uniquely identified by its model version 343 (e.g. anemometer model A-77 v1), and is merely a logical combination graph node, as indicated by dotted outline.

Each document set can comprise a group of documents having respective document identifiers ("Doc ID") 351. Because a document (such as user manual UM) can belong to multiple document sets 341, the relationship between documents 351 and document set 341 is not a hierarchical relationship, but an N:N association shown by dashed line. Furthermore, each document is associated with a corresponding document type 350. Example document types 350 can include user manual, circuit diagram, warranty description, calibration certificate, and so on.

The meteorological data hierarchy in FIG. 3 has a root node 302, comprising three components, climate zones collection 312, monitoring sites 314, and history logs 316. The climate zones collection 312 has a number of individual child climate zones 342, which can be rainforest, Mediterranean, desert, temperate, and so on. Monitoring sites 314 can be grouped according to country 324 (for example, Germany, USA, or India), region (for example, a state such as Baden-Württemberg, California, or Karnataka), and vicinity (for example, the cities of Walldorf, Palo Alto, or Bangalore). Each vicinity 344 can be associated with a corresponding climate zone 342. Within each vicinity 344, one or more monitoring stations 354 can be situated. Each monitoring station can also be associated with one or more meteorological instruments, as indicated by the N:1 association between instrument serial numbers 353 and monitoring sites 354.

Similarly, history data 316 can be organized by year 326 and date 336. Finally, for each date, there can be readings 356 for respective stations 354. Each readings instance 356 can comprise a time history (or single observations) for one or more instruments of the corresponding monitoring station. Since readings 356 can be uniquely specified by a date 336 and monitoring station 354, the readings 356 could have been treated as a combination node. However this is a matter of definition of a particular database environment, and in the illustration of FIG. 3, the readings 356 are independently instantiated, as shown by the solid outline of the readings node 356. The various hierarchical relationships (solid lines) and associations (dashed lines) are shown in FIG. 3. One of ordinary skill will recognize that the graph 300 is merely a simple illustration, and that a wide range of variations is possible.

An Example Use Case for Spawning a Root Node

Figure 4:
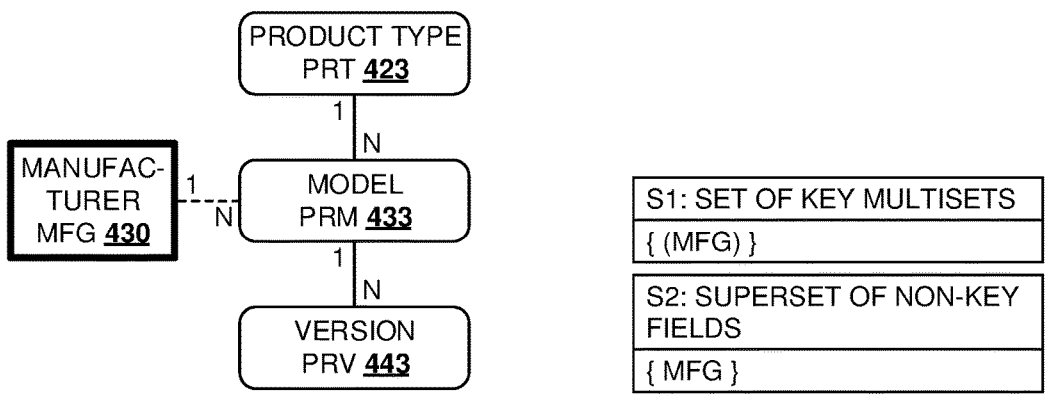
FIGS. 4A-4F depict an example use case for spawning a root node, according to disclosed technologies.

FIG. 4 depicts an example use case for spawning a root node, according to the disclosed technologies. FIG. 4A shows a portion of a meteorological database graph similar to graph 300 of FIG. 3. In this example, a new instance of manufacturer 430 is sought to be added to the database environment and, accordingly, the node for manufacturer 430 is shown with bold outline. For convenience, the graph nodes are referred to by their short codes as shown in FIG. 3, thus MFG for manufacturer 430, PRM for product model 433, and so on.

The database tables in the database environment contain fields (columns) which are key fields, and other fields (columns) which are non-key fields. The collection of key fields form a multiset. The collection of non-key fields form a set.

According to examples of the disclosed technologies, two target sets are formed for this use case, as shown in FIG. 4B. Set S1 is a set of key field multisets. In this use case, set S1 includes a single member, which is a singleton multiset of the node for which a new instance is to be spawned; this multiset is (MFG) and set S1 is {(MFG)}. In this use case, set S2 is a set of non-key fields, and contains just the MFG field; thus S2 is {MFG}. It should be noted that in this and some other disclosed use cases, target set S1 has members which are multisets of fields, while target set S2 has members which are fields.

FIGS. 4C-4D indicate an example of a database table similar to 122b that can be augmented for this use case. FIG. 4C shows a portion of a database table having one key column (MFG) and two non-key columns—Location for the manufacturer's headquarters location, and Founded for the year in which the manufacturer was founded. According to examples of the disclosed technologies, a key field multiset and a non-key field set are formed for each candidate database table which is under consideration for augmentation. The blank row and column of the table in FIG. 4C indicate that the table could have more rows and more columns. One of ordinary skill will recognize that additional columns could affect the analysis of key and non-key fields described herein, while additional rows generally will not.

As used in this disclosure, a "key field multiset" of a database table is the multiset of all key fields which are among the nodes (or, nodes and edges) of the database graph. In examples, there could be key columns that are not nodes of the database graph: these can be ignored while forming the key field multiset. As used in this disclosure, a "set of non-key fields" of a database table, is the set of all non-key fields which are among the nodes (or, nodes and edges) of the database graph. In examples, there could be non-key columns that are not nodes of the database graph: these can be ignored while forming the set of non-key fields.

It should be noted that a database table can have multiple fields associated with the same graph node, which can all be key fields, or all non-key fields, or a mix of key fields and non-key fields.

Returning to FIGS. 4C-4D, the only key field is MFG, and since this does correspond to a graph node, MFG 430, the key field multiset is simply (MFG). The two non-key fields are Location and Founded, neither of which is a graph node, so the set of non-key fields is an empty set { }. The key field multiset (dubbed key multiset for short) M3 and the set of non-key fields S4 are shown in FIG. 4D.

In this example, as will be explained further below, key multiset M3 is a member of target set S1, and the set of non-key fields S4 is a subset of target set S2, and the database table of FIG. 4C can be augmented.

FIGS. 4E-4F indicate an example of a database table similar to 122a that will not be augmented for this use case. FIG. 4E shows a portion of a database table having two key columns (MFG, PRM) and two non-key columns (Current indicating current availability of product PRM from manufacturer MFG, and PRT indicating the product type of product PRM). In this example, the two key fields MFG and PRM are both graph nodes, so the key multiset M3 is (MFG, PRM). Of the two non-key columns, PRT is a graph node, but Current is not a graph node, so the set of non-key fields S4 is simply {PRT}. Key multiset M3 and non-key field set S4 are shown in FIG. 4F.

In this example, as will be explained further below, key multiset M3 is not a member of target set S1, and the set of non-key fields S4 is not a subset of target set S2. Either one of these conditions would suffice to block augmentation; the database table of FIG. 4E will not be augmented. As one of ordinary skill will recognize, it is not always necessary to evaluate both M3 and S4; a decision to not augment can be made after finding that S4 is not a subset of S2, in which case M3 need not be evaluated. With this illustration in hand, an example method can be described in more detail.

Example Other Method of Spawning a New Instance

Figure 5:
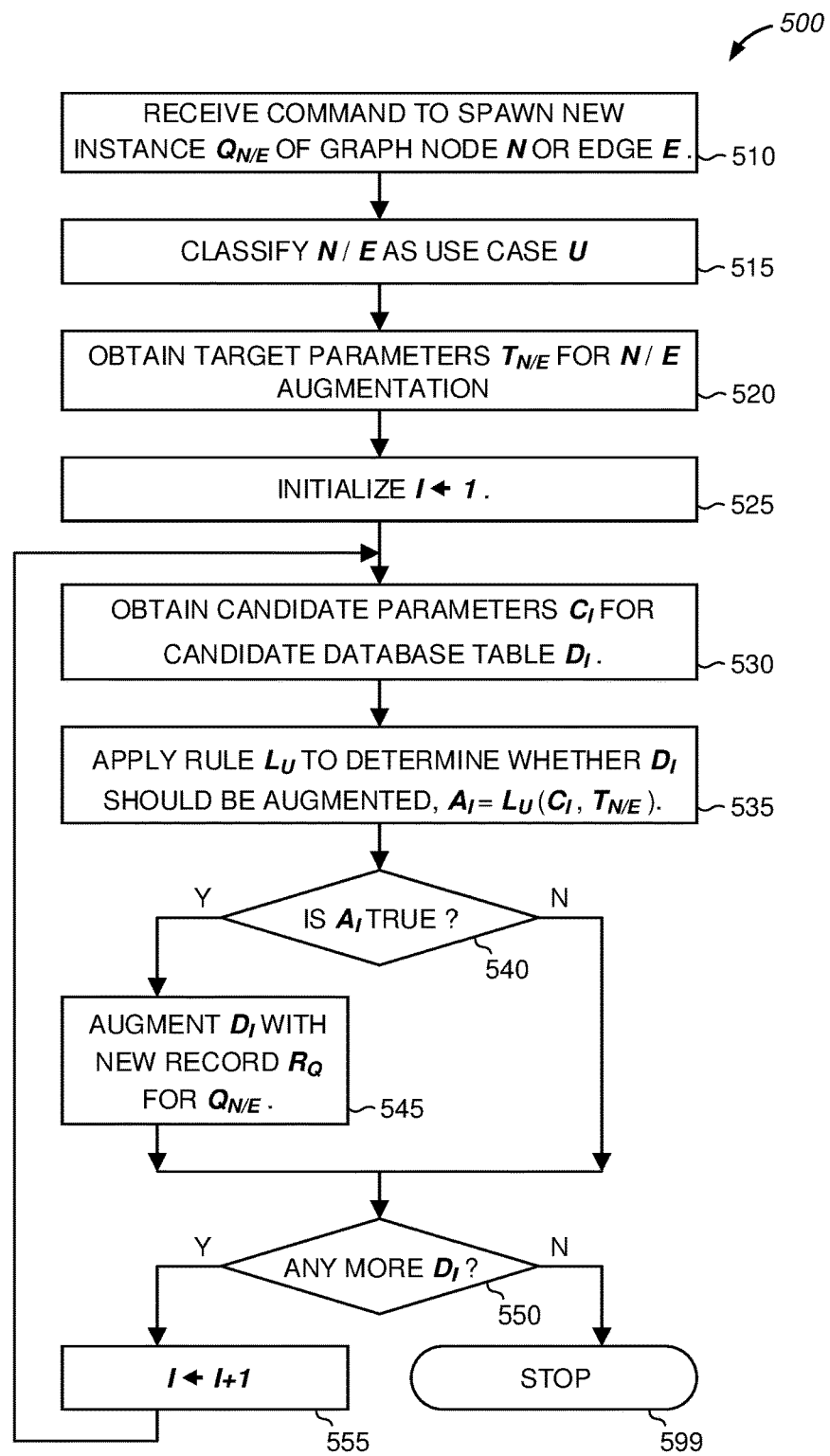
FIG. 5 depicts a flowchart of an example method of spawning a new instance of a database graph node or edge according to disclosed technologies.

FIG. 5 depicts a flowchart 500 of an example method of spawning a new instance of a database structure graph node or edge according to disclosed technologies. The method can be performed by a table augmentation manager similar to 130. At process block 510, a command is received to spawn a new instance Q of a node N or edge E of the graph of a database environment. This instance can be denoted $Q_N$, for an instance of node N, or $Q_E$, for an instance of edge E, or $Q_{N/E}$ generically. At process block 515, the node N or edge E is classified, based on the situation of N/E in the graph, as belonging to a particular use case U. The use case for a root node has been described above; other use cases are described below.

At process block 520, target parameters $T_{N/E}$ are obtained for the node N or edge E, according to the use case determined at process block 515. In the root node example of FIG. 4, the target parameters are the target set S1 of key field multisets, and the target set S2 of non-key fields as shown in FIG. 4B. Some other use cases have similar target sets for target parameters $T_{N/E}$, while other use cases can have different types of target parameters. In examples, the target parameters $T_{N/E}$ can be determined by constructing e.g. target sets S1 and S2 as described below in accordance with the use case U, while in other examples the target parameters $T_{N/E}$ have been previously determined and can be retrieved from a copy control store.

At process block 525, loop initialization is performed for evaluating various database tables in the database environment. As shown, an iteration index I is initialized to 1, however in other examples, other initialization can be performed. The method proceeds to loop over a set of candidate database tables. In some examples, all database tables in the relational database environment can be evaluated in the following loop, while in other examples, a prime node PN is identified for the use case U, as described further below, and only those database tables having the prime node as a key field are retained as candidate database tables.

At process block 530, candidate parameters $C_I$ are evaluated for database table $D_I$. Database tables $D_I$ can be similar to the tables examined above in FIGS. 4C, 4E, or can generically be similar to tables 122a-122m of FIG. 1. The candidate parameters can be the key multiset M3 and the non-key field set S4, as described above for FIGS. 4D, 4F.

At process block 535, a rule $L_U$ is applied, according to use case U, to determine whether table $D_I$ should be augmented. Rule $L_U$ can include testing one or more conditions. The rule can vary according to the classification of the node or edge in the graph. This determination depends on candidate parameters $C_I$ and target parameters $T_{N/E}$; the result of this determination can be denoted $A_I$, which can be a Boolean variable or some numerical or text equivalent such as 0|1, "T"|"F", "True"|"False;" thus $$A_I = L_U(C_I, T_{N/E}).$$

At process block 540, a check is made whether $A_I$ is true or false. If true, then the table $D_I$ is augmented at process block 545 with a new entry $Y_Q$ for the new instance Q. If process block 540 finds that is false, then process block 545 is bypassed and table $D_I$ is not augmented.

At process block 550, a check is made whether there are any more candidate database tables $D_I$. If no, then the N branch is followed and the method terminates at process block 599. Otherwise, index I is incremented at process block 555, and the method loops back to process block 530 to process the next database table $D_I$.

Example Other Method

Figure 6:
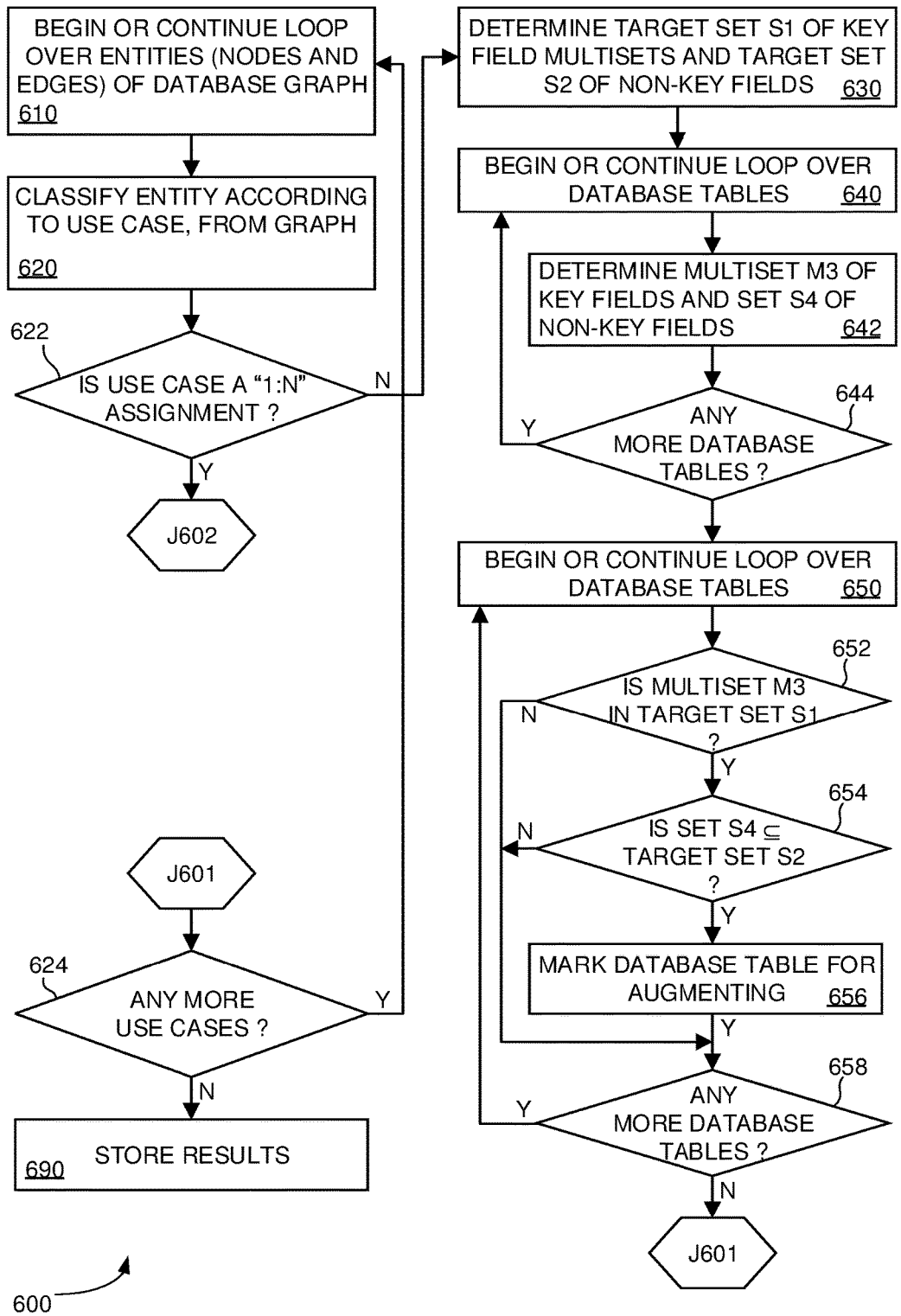
FIGS. 6 and 7 depict a flowchart of an example method of copy control in a graph-based relational database, according to disclosed technologies.
Figure 7:
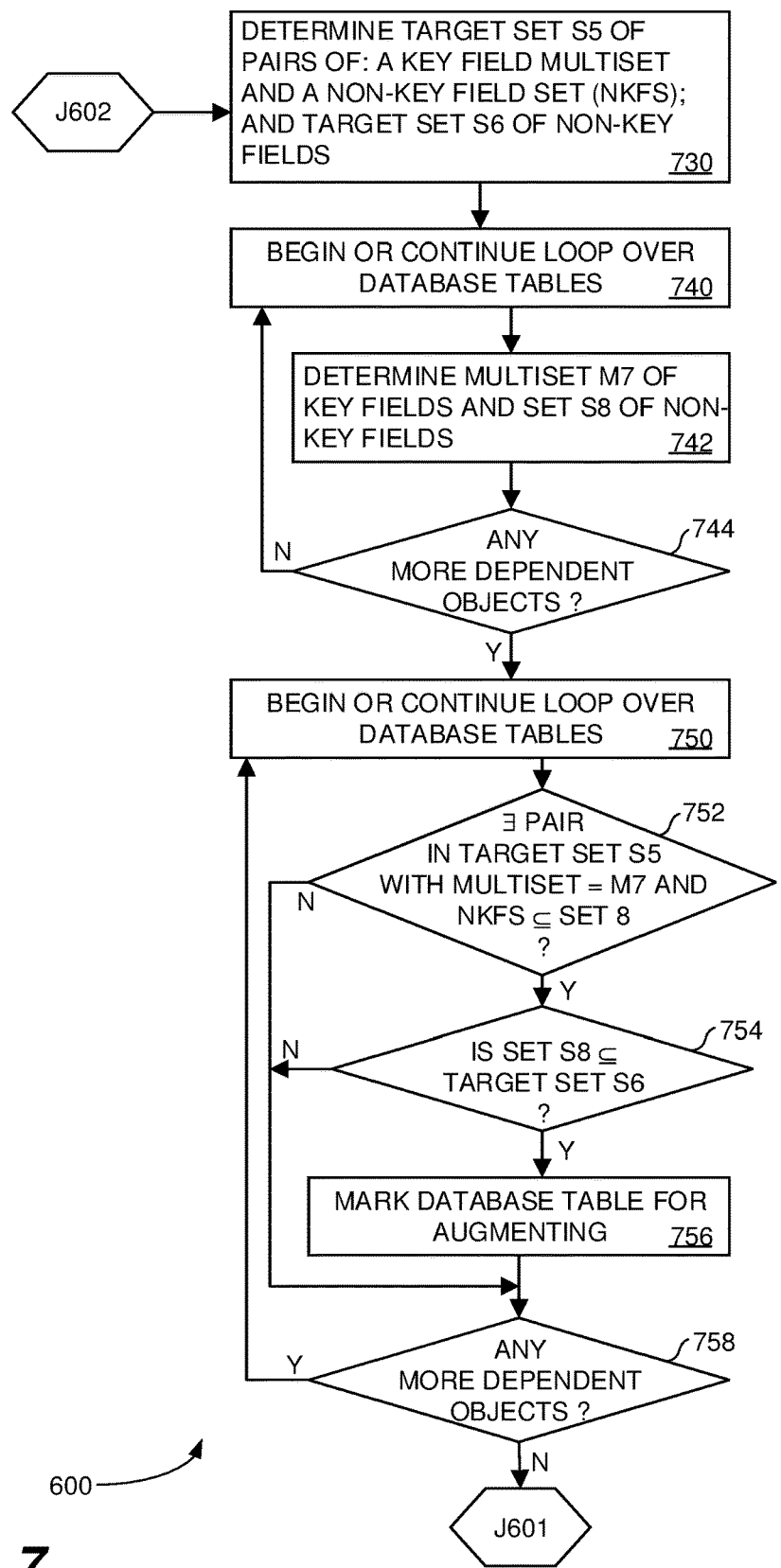

FIGS. 6-7 depict a flowchart 600 of an example method according to the disclosed technologies. The left column of FIG. 6 depicts the top level of the method. The right column of FIG. 6 depicts details for all use cases except a "1:N" assignment, and FIG. 7 depicts details for the use case of a "1:N" assignment.

Beginning with the left column of FIG. 6, at process block 610 a loop is begun over elements (nodes and edges) of the database graph. In some examples, the loop is over all nodes and edges of the graph, while in other examples some nodes and/or edges can be excluded, and in further examples, only a select group of nodes and/or edges can be processed. Nodes can be excluded if it is known that there is and can be only one instance of the node. Examples of such nodes can be the document library 311, the sites component 314, or the meteorological data root node 302 of FIG. 3. Some hierarchical edges can be excluded if a new instance can only be spawned when an instance of the corresponding child node is added. Processing can be limited to a select group of nodes when a portion of the database graph is reorganized without impacting other portions of the graph. For example, if the meteorological equipment hierarchy 301 of FIG. 3 is reorganized, leaving instrument serial numbers 351 and the hierarchy of meteorological data 302 intact, there could be no need to re-evaluate the nodes and edges of the hierarchy of meteorological data 302, and processing can be limited to nodes and edges within the hierarchy of meteorological equipment 301.

At process block 620, a current graph element is classified as one of the use cases described further below. At process block 622, the use case is checked whether it corresponds to a 1:N assignment, which requires special handling, and for which the method follows the Y-branch to jump tag J602 to FIG. 7. Otherwise, the N branch is followed from decision block 622 to process block 630. After evaluation of the appropriate use case for the current graph element, all use cases eventually lead to jump tag J601, whereby the method proceeds to decision block 624, where a check is made if there are any more elements to be evaluated. If yes, the method loops back to process block 610 and continues with the next element (node or edge) of the database graph. If all elements have been evaluated, the loop is complete, and the method proceeds to process block 690 where the results are stored for later use.

Turning to the method details in the right column of FIG. 6, process block 630 is reached from decision block 622 for all use cases except the "1:N" edge. At process block 630, target sets S1 and S2 are determined for the current node or edge element. The target set S1 is a set of key field multisets, which can be use case dependent as described further herein. The target set S2 can be a set of non-key fields, which can also be use case dependent as described further herein.

With the target sets S1 and S2 determined, the method proceeds to evaluation of database tables that are relevant to the present node or edge element. At process block 640, a loop over these database tables is begun. At process block 642, complete multiset M3 of key fields and complete set S4 of non-key fields are determined. As described herein, only fields corresponding to nodes of the database graph are retained in multiset M3 and set S4. At decision block 644, a determination is made whether any more database tables remain to be evaluated. If yes, then the Y branch loops back to process block 640 to continue the loop with the next database table. Otherwise, the method proceeds to process block 650, where another loop over database tables is begun.

At decision block 652, a check is made whether multiset M3 is a member of target set S1. If not, then the current database table does not need to be augmented for the current graph element, and the method jumps to decision block 658 to continue the loop over database tables. If multiset M3 is found to be a member of target set S1, then the second condition is checked at decision block 654, whether non-key field set S4 (which can have zero, one, or multiple members) is a subset of target set S2. If not, then then the current database table does not need to be augmented for the current graph element, and the method jumps to decision block 658. However if S4⊆S2, then both conditions are satisfied, and the Y branch is followed to process block 656, where the current database table is marked to be augmented whenever a new instance of the current node or edge element is spawned. At decision block 658, a check is made whether there are any more database tables. If yes, then the method follows the Y branch back to process block 650 to continue with the next database table. Otherwise, the detail method for this element is complete, and the N branch is followed via jump tag J601 to the top level of the method at decision block 624.

Turning back to decision block 622, the Y branch is followed for elements that are "1:N" edges, leading via jump tag J602 to process block 730 in FIG. 7. As used in this disclosure, the notation "1:N" edges extends to edges that have cardinality 0,1:N, 1:0,N, or 0,1:0,N. (The cases of 0,N:N, N:0,N, and 0,N:0,N edges can be considered along with the case of "N:N" edges.) An example 0,1:N edge is described below with reference to FIG. 14.

At process block 730, and analogous to process block 630, target sets S5 and S6 are determined. S6 is a set of non-key fields, however S5 is a set of pairs. Each pair contains a key field multiset and a non-key field set. Further details of these target sets are discussed in context of FIG. 15. Process blocks 740, 742, 744 mirror process blocks 640, 642, 644. For each database table, its complete multiset M7 of key fields and its complete set S8 of non-key fields are determined. As before, only fields that correspond to graph nodes are retained.

Process blocks 750-758 are similar to process blocks 650-658, looping over database tables and checking two conditions for each database table. At decision block 752, the pairs in target set S5 are searched for a pair having multiset equal to multiset M7, and non-key field set that is a subset of set S8, where M7 and S8 are for the current database table. If such a pair is found, then the method proceeds to check the second condition at decision block 754, otherwise there is no need to evaluate decision block 754. At decision block 754 the second condition is checked, whether set S8 is a subset of target set S6. If both conditions are satisfied, then the current database table is marked for augmenting for new instances of the current graph edge. In any case, the method reaches decision block 758. If there are further database tables, the Y branch is followed back to process block 750 to continue the loop. Otherwise, the detail method for this element is complete, and the N branch is followed via jump tag J601 to the top level of the method at decision block 624.

Thus, when the method reaches process block 690, a group of graph nodes and/or edges have been processed. For each of these graph nodes and/or edges, the database tables that should be augmented have been determined. These results can be stored for subsequent use in an array, table, list, tree, or other suitable data structure. Subsequently, when a new instance of a graph node or edge is to be spawned, the stored results can be accessed to retrieve a set of database tables in the database environment that should be augmented with a new entry for the new node/edge instance.

One of ordinary skill in the art will recognize that many variations of flowchart 600 are possible. For example, loops 640-644 can be consolidated with loop 650-658 into a single loop, or decision blocks 752, 754 can be interchanged. Branch 730-758 can be omitted in examples supporting no 1:N use cases.

An Example Use Case for Spawning a Child Node

FIG. 8 depicts an example use case for spawning a child node of an existing parent node, according to the disclosed technologies. FIG. 8A shows a portion of a meteorological database graph similar to graph 300 of FIG. 3. In this example, a new instance of Station 854 is sought to be added to the database environment and, accordingly, the node for Station 854 is shown with bold outline. For convenience, the graph nodes are referred to by their short codes, thus ST1 for station 854, PRM for product model 833, and so on.

According to examples of the disclosed technologies, two target sets are formed for this use case, as shown in FIG. 8B. Set 51 is a set of key field multisets. As usual, sets are denoted using braces "{ }"; to distinguish from these, multisets are denoted with parentheses "( )" in this disclosure. In this use case, set S1 includes two members, which are (i) a singleton multiset of the node for which a new instance is to be spawned, this multiset is (ST1), (ii) a two-member multiset of the child node ST1 and its parent VIC, this multiset is (ST1, VIC). Thus, set S1 is {(ST1), (ST1, VIC)}. In this use case, set S2 is a set of non-key fields, and contains fields corresponding to the child and parent nodes; thus S2 is {ST1, VIC}.

FIGS. 8C-8D indicate an example of a database table similar to 122b that can be augmented for this use case. FIG. 8C shows a portion of a database table having one key column (ST1) and two non-key columns—Zip code, a postal code of the station's street address, and a hyperlink pointing to additional information about the station. Because the only key field, ST1, corresponds to a graph node, the key field multiset M3 is simply (ST1). Neither of the two non-key fields are graph nodes, so the set of non-key fields S4 is an empty set { }. The key multiset M3 and the set of non-key fields S4 are shown in FIG. 8D.

Because key multiset M3 is a member of target set S1, and the set of non-key fields S4 is a subset of target set S2, the database table of FIG. 4C can be augmented when a new Station instance is to be spawned.

FIGS. 8E-8F indicate an example of a database table similar to 122a that will not be augmented for this use case. FIG. 8E shows a portion of a database table having two key columns (ST1, PRM) and one non-key column DC1 (which could be an installation manual for instrument model PRM at the station ST1). In this example, the two key fields ST1 and PRM are both graph nodes, so the key multiset M3 is (ST1, PRM). The non-key column, DC1 is also a graph node, so the set of non-key fields S4 is simply {DC1}. Key multiset M3 and non-key field set S4 are shown in FIG. 8F.

In this example, key multiset M3 is not a member of target set S1, and the set of non-key fields S4 is not a subset of target set S2. Either one of these conditions would suffice to inhibit augmentation; the database table of FIG. 8E will not be augmented.

An Example of Table Augmentation

Figure 9:
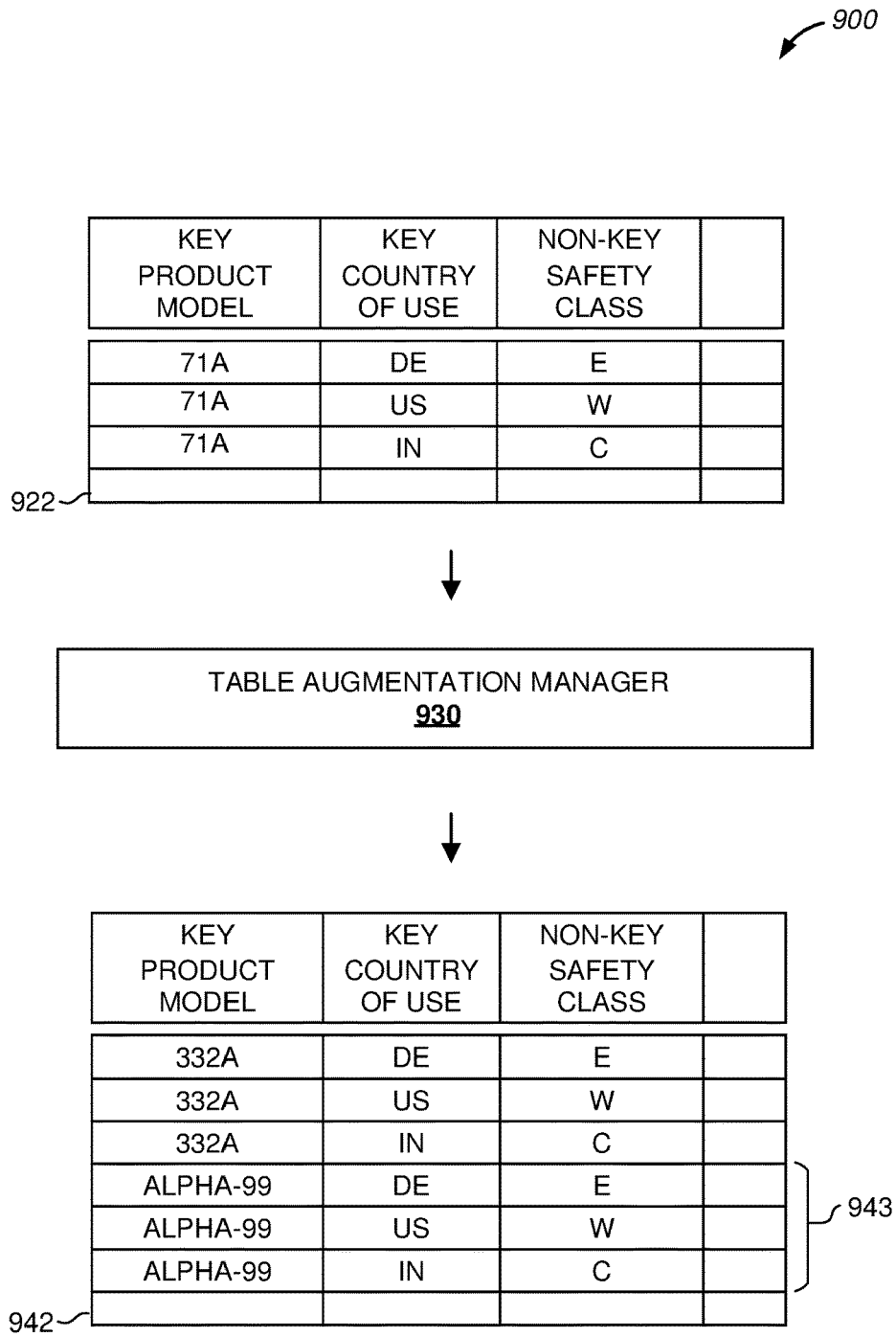
FIG. 9 depicts an example data flow for an augmented data table.

FIG. 9 depicts an example data flow 900 for an augmented data table. Database table 922 is similar to table 122b of FIG. 1, and can be understood as an example data table of the meteorological database environment of FIG. 3. Database table 922 has two key columns, but only Product Model is a graph node, so that the key multiset of table 922 is (PRM). Likewise, the only non-key column Safety Class is not a graph node, hence the set of non-key fields is the empty set { }. In this example, a new PRM instance for a product model "Alpha-99" is to be generated. Since the PRM node is a child of the product type node PRT, the use case of FIG. 8 is applicable, with target set S1={(PRM), (PRM, PRT)} and target set S2={PRM, PRT}. Table Augmentation Manager 930 can evaluate the logic for this use case and graph node, to determine that table 922 should be augmented. In this example, the new entry can be formed by cloning the entry (three rows) for product model 71A, adapted to reflect the new product model instance "Alpha-99". The augmented table 942 is shown in FIG. 9, having a new entry 943.

In the example shown, the other fields in new entry 943 are simply copied from the entry for product model 71A. In examples, some additional fields can be specified in the spawning request, and/or some additional fields can be left with blank, default, or dummy entries, to be populated subsequently by a database application.

An Example Graph of a Gene Library

Figure 10:
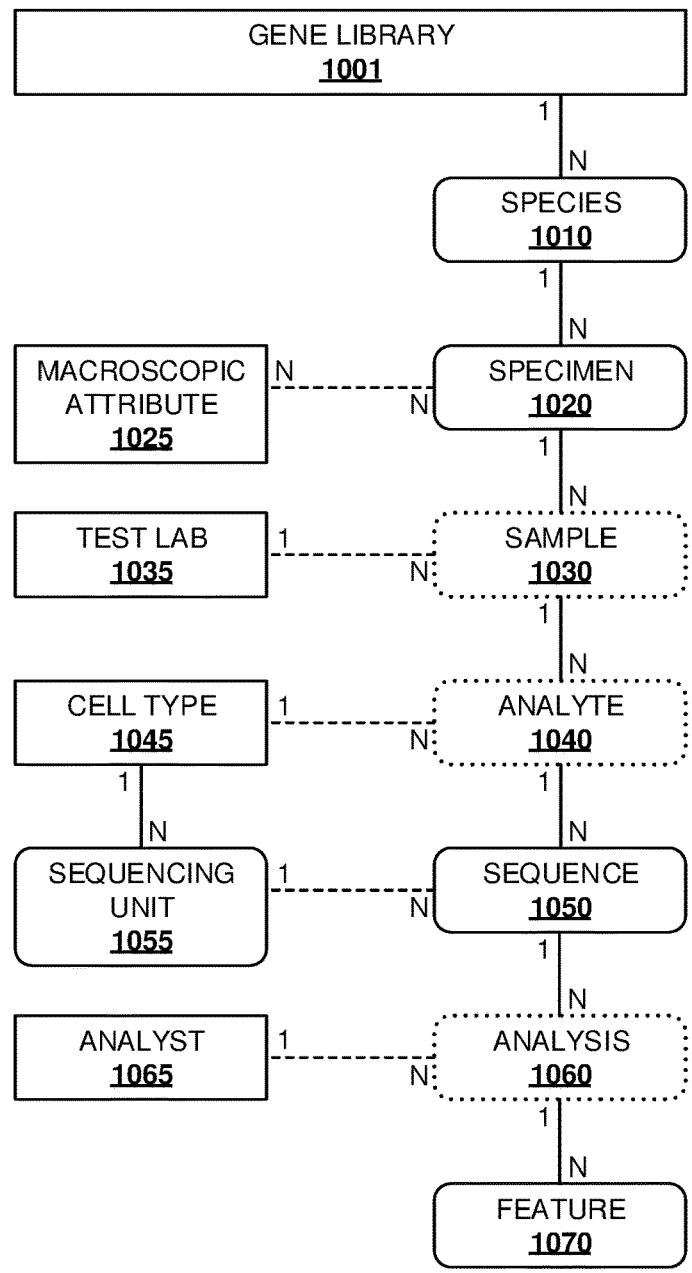
FIG. 10 depicts a graph of a gene library database.

FIG. 10 depicts a graph 1000 for a database of a gene library. A relational database for the gene library can incorporate a number of related database tables describing various entities pertaining to the gene library, such as samples, gene sequences, macroscopic attributes, genetic features, and their assorted properties and relationships.

Graph 1000 has a root node 1001 for the gene library as a whole. Below the root node 1001 are species 1010. The edge between the root node 1001 and daughter node 1010 has ends labeled "1" and "N" to indicate cardinality of the relationship. The cardinality can be read as follows: each species belongs to exactly one gene library, and the gene library can have N species. N can be any positive integer. Thus, the cardinality also indicates that there can be multiple species, even though only one species (for species 1010) is shown in graph 1000. Because of this style of representation, the depicted node can refer to singular or plural species 1010, according to the context. The various different labels N in graph 1000 can represent the same or different numbers, and each value of N can vary over the lifetime of the database. By way of illustration, species 1010 could be bats, cats, and rats.

For each species 1010, there can be one or more specimens 1020, for example four bats, three cats, and one rat. Each specimen 1020 can be associated with one or more macroscopic attributes, for example fur color or presence of kidney disease for cats. Since each specimen 1020 can have a plurality of macroscopic attributes, and each macroscopic attribute can be associated with a plurality of specimens, the relationship is shown as N:N. Furthermore, the macroscopic attributes are not part of the gene library hierarchy, and are regarded as global objects which can be associated variously with specimens 1020 of different species 1010.

For each specimen 1020, tissue samples 1030 can be sent for sequencing to respective test labs 1035. In this example, the test lab 1035 and specimen 1020 uniquely characterize the sample 1030, and the samples 1030 need not be instantiated as separate objects. Rather, each sample 1030 can be represented as a <Specimen, TestLab> pair. Accordingly, the sample 1030 is merely a logical combination node, shown for convenience of illustration and discussion, and indicated by a dotted outline in FIG. 10.

From each sample 1030, different cell types 1045 can be extracted for sequencing analysis. In this example, the cell extract is termed an analyte 1040, which is uniquely characterized by a <Sample, Cell Type> pair, and need not be instantiated as a separate object. Analyte 1040 is another logical combination node, also shown by dotted outline in FIG. 10.

Within each cell, sequencing can be performed on different entities, such as genes, RNA, proteins, or mitochondria, which are collectively termed Sequencing Units 1055 in this example. When sequencing is performed for a particular Sequencing Unit (e.g. mitochondria) of a given analyte 1040, the sequence data 1050 is obtained. Although, the sequence data 1050 could be regarded as uniquely defined by a <Sequencing Unit, Analyte> pair and treated as a logical combination node, the sequence data 1050 are entities of primary importance in the gene library 1050, and are therefore instantiated as separate objects as a matter of design choice for the illustrated database. The sequence data 1050 are represented with a solid outline in graph 1000.

In a publicly available gene library 1000, the sequence data could be analyzed by many different entities, such as university labs, companies, or even private individuals, who are collectively referred to as analysts 1065. The output of their work is stored within the gene library database as Analyses 1060. Finally, within each analysis 1060, a number of genetic features 1070 can be identified, such as fragments of a gene sequence 1050 that are unusual, associated with some macroscopic attribute 1025, and/or of comparative interest with other specimens 1020 or species 1010.

The relationships between Macroscopic Attribute 1025↔Specimen 1020, between Test Lab 1035↔Sample 1030, between Cell Type 1045↔Analyte 1040, between Sequencing Unit 1055↔Sequence 1050, or between Analyst 1065↔Analysis 1060 are shown as dashed lines since they do not represent a "belongs to" relationship within the hierarchy of software product suite 1001.

In contrast, the relationship between Sequencing Unit 1055 and Cell Type 1045 is a "belongs to" relationship and is shown as a solid line. As illustrated, Cell Type 1045 and Sequencing Unit 1055 form an object hierarchy (with Cell Type 1045 as the root node) that is separate from the object hierarchy having Gene Library 1001 as root node. Thus, a database environment can have multiple object hierarchies that coexist and are related via graph 1000 and/or via tables of the database. In alternative examples, and as a design choice, cell type 1045 objects could have been defined as children of the gene library 1000 root node with a 1:N relationship from gene library 1001 to cell type 1045. Generally, a database graph having a plurality of object hierarchies can be coalesced into a single hierarchy, for example by defining a new Super-Root node that is parent to all the root nodes of respective object hierarchies.

One of ordinary skill will appreciate that this is a simplified example, and that the database for gene library 1001 can include other relationships (such as between gene library 1001 and cell type 1045) or more complex relationships. For example, a test lab 1035 can receive multiple samples 1030, in which case a sample 1030 is not uniquely defined by a <Test Lab, Specimen> pair, and could be instantiated as its own object (and shown with a solid outline).

An Example Use Case for Spawning a Logical Combination Node

FIG. 11 depicts an example use case for spawning a logical combination node, according to the disclosed technologies. FIG. 11A shows a portion of a gene library database graph similar to graph 1000 of FIG. 10. In this example, a new instance of Analyte 1140 is sought to be added to the database environment and, accordingly, the node for Analyte 1140 is shown with bold outline. For convenience, the graph nodes are referred to by their short codes, thus ANT for analyte 1140, CT for cell type 1145, and so on.

According to examples of the disclosed technologies, two target sets are formed for this use case, as shown in FIG. 11B. Set S1 is a set of key field multisets. In this use case, set S1 includes a single member multiset which includes fields for the constituent nodes of the combination node. This multiset could be (CT, SMP) except that SMP itself is a logical combination node. Resolving SMP, the multiset (CT, SPE, TL) is obtained, and set S1 is thus {(CT, SPE, TL)}. In alternate embodiments, set S1 can be extended to include other combinations of nodes such as (CT, SPE). The extended set S1+ contains two multisets and is {(CT, SPE, TL), (CT, SPE)}, as shown in FIG. 11B. In this use case, target set S2 of non-key fields contains all constituent nodes of the logical combination node, ANT, and is similarly {CT, SPE, TL}.

FIG. 11C shows a portion of a database table having two key columns, both of which are graph nodes, and one non-key column, which is not a graph node. Thus, the key field multiset M3 is simply (CT, SPE), and the set of non-key fields S4 is an empty set { }. The key multiset M3 and the set of non-key fields S4 are shown in FIG. 11D.

The set of non-key fields S4 is a subset of target set S2. The multiset M3 is not a member of target set S1, however M3 is a member of target set S1+. Thus in examples using the extended target set S1+, the database table of FIG. 11C can be augmented. However, the database table of FIG. 11C will not be augmented in examples using the simpler target set S1.

FIGS. 11E-11F indicate an example of a database table similar to 122b that can be augmented for this use case, regardless of whether target set S1 or S1+ is used. FIG. 11E shows a portion of a database table having three key columns CT, SPE, TL, all of which are graph nodes, and a non-key field CT. In this example, the first column is a key CT field, which the fourth column is a different non-key CT field, which can represent, for example, a second cell type that is related to the cell type in the first column. Thus in this example, the key multiset M3 is (CT, SPE, TL), which is a member of both target set S1 and target set S1+. The non-key field set is {CT}, from the fourth column, which is a subset of target set S2. Thus, by the logic described herein, the table of FIG. 11E can be augmented, regardless of whether target set S1 or S1+ is used, when an new Analyte 1140 instance is requested.

An Example Graph of a Software Product Suite

FIG. 12 depicts a graph 1200 for a database of a software product suite. A relational database for the software product suite can incorporate a number of related database tables describing various entities pertaining to the software product suite, such as code modules, editions, and developers, and their assorted properties and relationships.

Graph 1200 has a root node 1201 for the software product suite as a whole. Below the root node 1201 are applications 1210, a code library 1212, and a development team 1214. The edges between the root node 1201 and daughter nodes 1210, 1212, 1214 have ends variously labeled "1" and "N" to indicate cardinality of the relationships. The cardinalities can be read as follows: each application belongs to exactly 1 software product suite, and the software product suite can have N applications. N can be any positive integer. Thus, the cardinality also indicates that there can be multiple applications, even though only one object (for application 1210) is shown in graph 1200. Because of this style of representation, the depicted object can sometimes be referred to as applications 1210 or as application 1210, according to the context. In contrast, the software product suite 1201 has only one code library 1212 and only one development team 1214. The various different labels N can represent the same or different numbers, and each value of N can vary over the lifetime of the database.

By way of illustration, a software product suite 1201 for general office functions can include applications 1210 for word processing, spreadsheet, and presentations. Or as another illustration, a software product suite 1201 for integrated circuit design can include applications 1210 for functional verification, timing verification, and optical process correction.

Code library 1212 can incorporate a plurality of code modules 1222, and development team 1214 can include one or more developers 1224. Because each module 1222 can be supported by multiple developers 1224, and each developer 1224 can be working on multiple code modules 1222, an N:N relationship between modules 1222 and developers 1224 is shown. Each application 1210 can be produced as respective titles 1220 for different platforms 1225, for example "Spreadsheet for Proprietary Desktop Operating System (PDOS)," or "Spreadsheet for Open Smartphone Platform (OSP)." Because each title is uniquely defined by a platform (Open Smartphone Platform) and application (Spreadsheet), the titles need not be instantiated as separate objects. Rather, each title can be represented as an <Application, Platform> pair. Accordingly, the Title is merely a logical combination node, shown for convenience of illustration and discussion, and indicated by a dotted outline in FIG. 12. Similarly, each title 1220 can be customized as respective editions 1230 in different languages 1235. Thus, an edition could be "Spreadsheet for PDOS in English," or "Presentations for OSP in German."

The relationships between Platform <-> Title and between Language <-> Edition are shown as dashed lines since they do not represent a "belongs to" relationship within the hierarchy of software product suite 1201. Further, an N:N relationship between modules 1222 and titles 1220 is illustrated, since each module can be reused in multiple titles, and each title can incorporate multiple modules.

One of ordinary skill will appreciate that this is a simplified example, and that the database for software product suite 1201 can include other objects such as documentation, quality assurance (QA) test logs, and other entities.

An Example Use Case for Spawning an N:N Association Edge

Figures 13A, 13B, 13C, 13D, 13E, 13F:
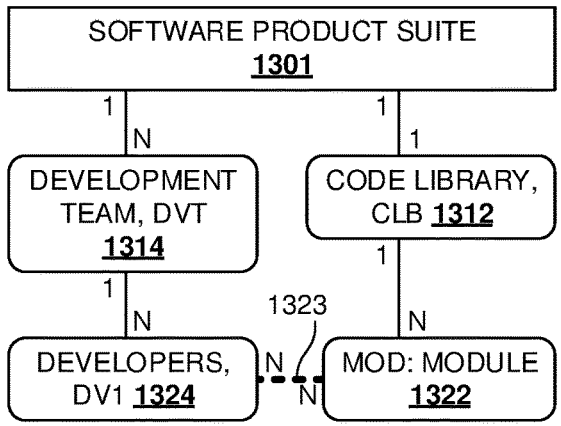
FIGS. 13A-13F depict a fourth example use case, for spawning an N:N (many-to-many) association between two nodes, according to disclosed technologies.

FIG. 13 depicts an example use case for spawning an N:N (many-to-many) association between two nodes, according to the disclosed technologies. FIG. 13A shows a portion of a software product suite database graph similar to graph 1200 of FIG. 12. In this example, a new instance of N:N edge 1323 is sought to be created, for example when an existing developer 1324 is given a new assignment on an existing code module 1322. Edge 1323 is shown in bold. For convenience, the graph nodes are referred to by their short codes, thus DV1 for developer 1324, MOD for code module 1322, and so on.

According to examples of the disclosed technologies, two target sets are formed for this use case, as shown in FIG. 13B. Target set S1 is a set of key field multisets. In this use case, set S1 includes a single member, which is a multiset containing the two nodes joined by edge 1323; this multiset is (DV1, MOD), and set S1 is {(DV1, MOD)}. In this use case, set S2 is a set of non-key fields, and contains fields corresponding to the same two nodes; thus S2 is {DV1, MOD}.

FIGS. 13C-13D indicate an example of a database table similar to 122b that can be augmented for this use case. FIG. 13C shows a portion of a database table having two key columns, DV1 and MOD, and one non-key column Date. Because both key fields correspond to graph nodes, the key field multiset M3 is simply (DV1, MOD). The non-key field is not a graph node, so the set of non-key fields S4 is an empty set { }. The key multiset M3 and the set of non-key fields S4 are shown in FIG. 13D.

Because key multiset M3 is a member of target set S1, and the set of non-key fields S4 is a subset of target set S2, the database table of FIG. 13C can be augmented when a new instance of edge 1323 is to be spawned.

FIGS. 13E-13F indicate an example of a database table similar to 122a that will not be augmented for this use case. FIG. 13E shows a portion of a database table having one key column DV1 and two non-key columns DVT and PHONE. In this example, the key field DV1 is a graph node, so the key multiset M3 is (DV1). Of the non-key columns, only DVT is a graph node, so the set of non-key fields S4 is simply {DVT}. Key multiset M3 and non-key field set S4 are shown in FIG. 13F.

In this example, key multiset M3 is not a member of target set S1, and the set of non-key fields S4 is not a subset of target set S2. Either one of these conditions would suffice to prevent augmentation; the database table of FIG. 13E will not be augmented.

An Example Graph of a County Library

Figure 14:
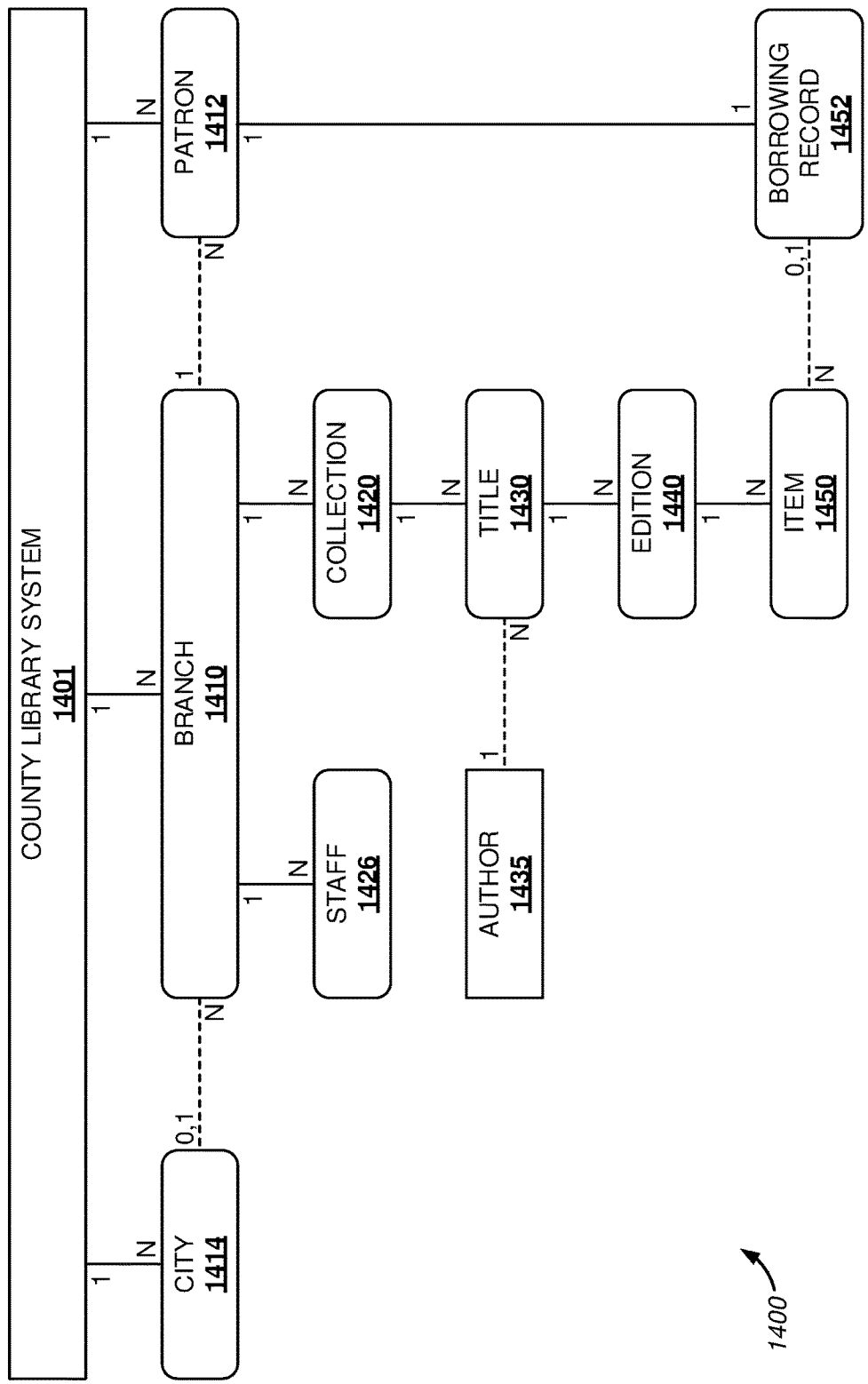
FIG. 14 depicts a graph of a county library database.

FIG. 14 depicts a graph 1400 of a county library database. A relational database for the library can incorporate a number of related database tables describing various entities pertaining to the library system, such as books, patrons, and staff, and their assorted properties and relationships.

Graph 1409 has a root node 1401 for the county library system as a whole. Below the root node 1401 are cities 1414, branches 1410, and patrons 1412. The edges between the root node 1401 and daughter nodes 1410, 1412, 1414 have ends variously labeled "1" and "N" to indicate cardinality of the relationships. The cardinalities can be read as follows: each branch belongs to exactly 1 county library system, and a county library system can have N branches. N can be any positive integer. Thus, the cardinality also indicates that there can be multiple branches, even though only one object (for branch 1410) is shown in graph 1401. Because of this style of representation, the depicted object can sometimes be referred to as branches 1410 or as branch 1410, according to the context. Similarly, the library system 1401 can have multiple patrons 1412, and there can be multiple cities 1414 represented within the county-wide system. The various different labels N can represent the same or different numbers, and each value of N can vary over the lifetime of the database.

In this example, each patron 1412 belongs to one branch 1410, as indicated by the dashed line between branch 1410 and patron 1412. Whereas the solid lines indicate a "belongs to" relationship, the dashed lines indicate relationship across branches of the object tree, or relationships with global objects (e.g. "Author" mentioned below), that are outside the hierarchy of the root node. Of course, the branch can have many patrons. Each city 1414 can have multiple branches 1410, each of which belongs to the city 1414. However, the county library system 1401 can also have branches in unincorporated areas of the county which are not associated with any city. Hence the relationship between cities 1414 and branches 1412 is labeled "0,1" on the end of city 1414.

In this example, each branch has several staff members 1422, and maintains various collections 1420, which could be e.g. adult fiction, adult non-fiction, music, DVDs, children's books, magazines, reference volumes, and so forth. Each collection 1420 can have a number of titles 1430, for example "The Call of the Wild." Each title 1430 is associated with an author 1435, for example, "Jack London." The Authors are not part of the library system/branch hierarchy and can be associated with any title, in any collection, at any branch. For these reasons, they are treated as global objects. Each author can be associated with multiple titles; in this example, the library could also own one or more copies of "White Fang." Each title 1430 could also be available in various editions 1440, e.g. hardcover, paperback, large print, and so forth; and the branch could have multiple copies 1450 (commonly, with unique barcode identifiers) of any edition.

A patron 1412 can have a borrowing record 1452, for keeping track of items checked out by the patron 1412. Accordingly, there can be a 1:N association from the borrowing record 1452 to each of the items 1450 that the corresponding patron 1412 may have borrowed.

In this example, it can often be required to add a new entry at any level below the root, for example a new copy 1450 of a book edition 1440, a new movie DVD title 1430, a new staff member 1426, or even a new branch library 1410. It can also be required to add a new association between a patron's borrowing record 1452 and the specific item 1450 borrowed. The disclosed technologies can facilitate these and related operations.

One of ordinary skill will appreciate that this is a simplified example. Some of the items and relationships can be more complex than indicated; for example, a book could have multiple authors, or a patron could have multiple library cards. Further, the county library system shown could have additional objects such as buildings, administrative departments, and financial functions.

An Example Use Case for Spawning an 1:N Association Edge

FIG. 15 depicts an example use case for spawning a 1:N (one-to-many) association between to nodes, according to the disclosed technologies. FIG. 15A shows a portion of a county library database graph similar to graph 1400 of FIG. 14. In this example, a new association between a patron 1512 and a branch 1510 is desired, which is a new instance of the edge 1511 indicated in bold. For convenience, the graph nodes are referred to by their short codes, thus PAT for patron 1512, BR for branch 1510, and so on.

According to examples of the disclosed technologies, two target sets are formed for this use case, as shown in FIG. 15B. Similar to other use cases, target set S2 is a set of non-key fields, and contains fields corresponding to the nodes joined by the 1:N association; in this example, S2 is simply {PAT, BR}. However, unlike some other use cases, target set S1 is a set of pairs. A pair is a 2-tuple: each pair of S1 has a first member that is a defined key field multiset, and a second member that is a defined set of non-key fields. In examples, S1 contains two pairs which can be denoted P11 and P12. The multiset member of P11 can be a singleton multiset comprising the node at the :N end of the 1:N association, thus (PAT), while the multiset member of P12 can be a 2-member multiset comprising both nodes, thus (PAT, BR). The non-key field set of P11 can be a singleton set comprising the node at the 1: end of the 1:N association, thus {BR}, while the non-key field set of P12 can be an empty set { }. Thus, S1={P11 P12}={((PAT), {BR}); ((PAT, BR), { })}. Target sets S1 and S2 are shown in FIG. 15B.

FIGS. 15C-15D indicate an example of a database table similar to 122b that can be augmented for this use case. FIG. 15C shows a portion of a database table having two key columns, PAT and BR, which both correspond to graph nodes, and two non-key columns—Date, which is not a graph node, and BR_2, which is another branch 1510 different from the BR column. By way of illustration, BR_2 could represent a branch that a patron was previously associated with. Because both key fields correspond to graph nodes, the key field multiset M3 is simply (PAT, BR). The set of non-key fields S4 is {BR}, from the BR_2 column. The key multiset M3 and the set of non-key fields S4 are shown in FIG. 15D.

As described above with reference to FIG. 7, the logic for this use case has two conditions. The first condition (see decision block 752) requires finding a pair in S1 whose multiset matches M3 and whose non-key field set is a subset of S4. In this example, P12 has a multiset (PAT, BR) which matches M3, and a non-key field set { } which is a subset of S4, so the first condition is satisfied. The second condition (see decision block 754) is a check that S4 {BR} is a subset of S2 {PAT, BR}, which is also satisfied. Since both conditions are satisfied, the database table of FIG. 15C can be augmented when a new edge 1511 is to be spawned.

FIGS. 15E-15F indicate an example of a database table similar to 122a that will not be augmented for this use case. FIG. 15E shows a portion of a database table having one key column PAT (which corresponds to a graph node) and two non-key columns REC (which is a borrowing record 1552) and PHONE (which is not a graph node). In this example, the key multiset M3 is (PAT) and the non-key field set is {REC}, as shown in FIG. 15F.

The first condition (see decision block 752) requires finding a pair in S1 whose multiset matches M3 and whose non-key field set is a subset of S4. In this example, P11 has a multiset (PAT) which matches M3, however the non-key field set {BR} of P11 is not a subset of S4 {REC}. P12 has a non-key field { } which is a subset of S4 {REC}, however its multiset (PAT, BR) does not match M3 (PAT). Thus S1 does not contain any pair satisfying the first condition, and for this reason alone the database table of FIG. 15E will not be augmented.

The second condition (see decision block 754) is also not satisfied because S4 {REC} is not a subset of S2 {PAT, BR}. Thus, even if the first condition had been satisfied, the database table of FIG. 15E would not be augmented.

An Example Graph of a Manufacturing Company

Figure 16:
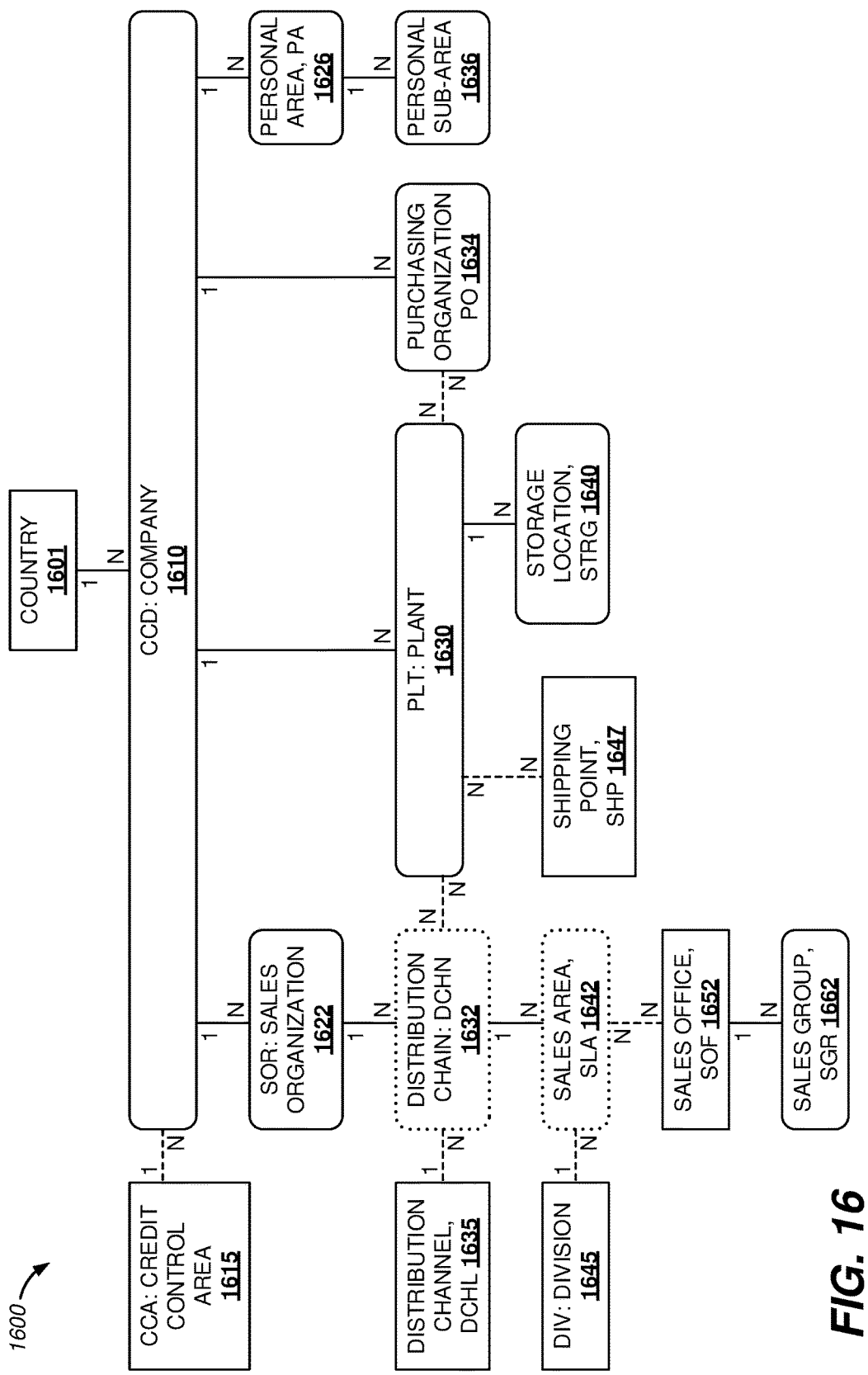
FIG. 16 depicts a graph of a database environment for a manufacturing organization.

FIG. 16 depicts a graph 1600 of a database environment for a manufacturing organization. At the center of the graph is a node for a manufacturing plant 1630. This graph is drawn with country 1601 being root node of a main hierarchy. The manufacturing organization can operate multiple companies 1610 within the country, each company can operate multiple plants 1630, and each plant can have multiple storage locations 1640, as indicated by the 1:N hierarchical relationships successively joining nodes 1601, 1610, 1630, and 1640. Each company can operate multiple purchasing organizations 1634, which can have N:N relationships with the plants 1630. By way of illustration one purchasing organization 1634 can supply raw materials to all of its company's plants 1630, while another purchasing organization 1634 can provide manufacturing equipment. Also, a root (or global) node is shown for shipping points 1647, which can have an N:N relationship with plants 1630, and could even be shared by different companies 1610 within the manufacturing organization. By way of illustration, a single plant 1630 can have different shipping points 1647 for incoming and outgoing shipments, and/or two nearby plants 1630 can share a shipping point 1647 near a railway station.

A company 1610 can also have multiple sales organizations 1622. A global or root node is shown for Distribution Channel 1635, which could represent, for example, wholesale, retail, or online sales channels. The combination of distribution channel 1635 and sales organization 1622 can be regarded as a distribution chain 1632, which need not be instantiated separately, and is a logical combination node shown by dotted outline. Another global or root node is shown for Division 1645, which can represent a geographic region. The combination of division 1645 and distribution chain 1632 can be regarded as a sales area 1642, which is also a logical combination node shown by dotted outline. Another root node is shown for sales office 1652, which can be organized as a plurality of sales groups 1662. Sales offices 1652 can have N:N relationships with Sales Areas 1642.

The manufacturing organization can maintain a credit control area 1615 within the database environment common to all its companies 1610. Additionally, personal areas 1626 can be provided for company staff, subdivided into personal sub-areas 1636.

FIGS. 19A-19B are diagrams of software interfaces illustrating a database table configured according to disclosed technology. In FIG. 19A, configuration interface 1900 shows that the database table has been configured to have key fields MTTYP (material type) and PLT (plant). Another field MTAVA (material availability) is not a key field. In FIG. 19B, a snapshot of the database table 1950 is shown having three records. All three records belong to the same plant "1010," but have different values of MTTYP (material type).

FIGS. 20A-20B are diagrams of software interfaces illustrating another database table configured according to disclosed technology. In FIG. 20A, configuration interface 2000 shows that this database table has been configured to have key fields ORTYP (order type) and PPLT (planning plant). The second line of the configuration screen shows that default values of the order type key field will be used when new records are added to this database table. Other fields APPLN (application) and CTLKY (control key) are not key fields. In FIG. 20B, a snapshot of the database table 2050 is shown having a single record. Exemplary values of the fields for this record are shown.

FIGS. 21A-21B are diagrams of software interfaces illustrating a further database table configured according to disclosed technology. In FIG. 21A, configuration interface 2100 shows that this database table has been configured to have CPRP (customer pricing procedure) and DPRP (document pricing procedure) as key fields. Three additional key fields represent the logical combination node SLA 1642 as described above with reference to FIG. 16. These fields are DIV (Division 1645), DCHL (Distribution Channel 1635), and SOR (Sales Organization 1622). Other fields PRPR and CTFE are not key fields. In FIG. 21B, a snapshot of the database table 2150 is shown having two single records. Exemplary values of the fields for this record are shown; the two records are distinguished by having different values for the CPRP key field.

FIGS. 22A-22B are diagrams of software interfaces illustrating an additional database table configured according to disclosed technology. In FIG. 22A, configuration interface 2200 shows that this database table has been configured to have key fields DIV (Division 1645) and SOR (Sales Organization 1622). This database table has no non-key fields. Because each record contains only a pair of these two fields, the database table can be regarded as an assignment between instances of the Division node 1645 and the Sales Organization node 1622. In FIG. 22B, a snapshot of the database table 2250 is shown having a single record. Exemplary values of the fields for this record are shown. In examples, as new instances of sales area 1642 are created, rows can be added to this database table as described herein.

One of ordinary skill will appreciate that this is a simplified example, and that the database for a manufacturing organization can include more, less, or different fields and relationships, with consequently many variations in the graph nodes and edges.

Example Summary of Use Cases

Following description of several database graphs and use cases above, the following summary is presented. As used in this disclosure, a graph is a structure having two or more nodes and one or more edges representing relationships between respective pairs of nodes. Commonly, graphs can be represented pictorially. Nodes and edges can have independent properties. In examples, the nodes of a graph can represent field names (column labels, or fields or columns for short) of tables in a relational database environment. In examples, edges can have cardinality, and can designate hierarchical relationships ("belongs to," or "has a") or associations.

U1. Adding an Instance of a Root Node.

Some nodes in a database graph have a "belongs to" relationship with another node and are dubbed child nodes. Any node that is not a child of another node is dubbed a root node. A root node need not have children. With respect to graph 1000 in FIG. 10, Gene Library 1001, Macroscopic Attributes 1025, Test Labs 1035, Cell Type 1045, and Analysts 1065 are all root nodes. Examples of this use case are discussed in the context of FIG. 4.

In examples, the target set S1 for use case U1 contains exactly one multiset, which is a singleton multiset consisting of the key field corresponding to the node being instantiated. The target set S2 contains a single member, which is this same field. Thus for a root node R, S1={(R)} and S2={R}.

The prime node PN for use case U1 is the root node.

U2. Adding an Instance of an Instantiated Child Node, Including the Relation to its Parent Node.

This use case is applicable in examples where the child node is instantiated, and the parent node is already in existence. An instantiated node is any node that is instantiated as itself within the database. In the exemplary graphs of this disclosure, instantiated nodes are represented with a solid outline. With respect to graph 1200 of FIG. 12, Module 1222 and Developer 1224 are child nodes of Code Library 1212 and Development Team 1214 respectively. Examples of this use case are discussed in the context of FIG. 8.

In examples, the target set S1 for use case U2 contains exactly two multisets, which are determined by taking the fields corresponding to (i) the to-be-instantiated child node as a singleton, and (ii) the child node together with its parent node. The target set S2 contains only two members, which are the fields corresponding to the child node and the parent node. Thus, for child C of root R, S1={(C), (C, R)} and S2={C, R}. Of course, as one of ordinary skill will recognize, the ordering of members of a set or multiset does not matter.

The prime node PN for use case U2 is the child node.

U3. Adding an Instance of a Logical Child Node.

A logical or combination node is any node that is not instantiated as itself within the database, and can be uniquely defined as a combination of other nodes. In the exemplary graphs of this disclosure, logical or combination nodes are represented with a dotted outline. With respect to graph 1000 in FIG. 10, Samples 1030, Analytes 1040, and Analyses 1060 are all logical child nodes. A logical node cannot be a root node. Examples of this use case are discussed in the context of FIG. 11.

In examples, the target set S1 for use case U3 contains one multiset, which is determined by taking fields corresponding to all instantiated nodes forming the logical child node. As shown in examples, there can be two, three, or more such nodes represented in the multiset. As shown in examples, target set S1 can be customized to include one or more additional multisets. The target set S2 contains the same fields corresponding to all instantiated nodes forming the logical child node. Thus, with logical child C1 being a combination of global node G1 and parent C2, which itself is a combination of global node G2 and parent P, target set S1={(G1, G2, P)} and target set S2={G1, G2, P}.

The prime node PN for use case U4 is the logical child node.

U4. Adding an Instance of a 1:N Relationship Between Nodes.

Relationships are associations between nodes of a database graph, and are represented in this disclosure by edges of the graph. Relationships can be divided into "1:N" and "N:N" families.

In a 1:N relationship (sometimes "1-to-N"), the node at the 1: end of the relationship is special to a node at the :N end and, in particular, a second node cannot be added at the 1: end (to make a 2:N relationship) without fundamentally changing the nature of the relationship. 1:N relationships can be hierarchical or can be non-hierarchical associations. In examples, the node at the 1: end can be optional, thus 1:N includes the 0,1:N case. 1:N can also include 1:0,N and/or 0,1:0,N cases. With reference to FIG. 14, the relationship between a book item 1450 and a borrowing record 1452 is 0,1-to-N. When a book is available on a library shelf, it is not associated with any borrowing record. When the book is checked out by a patron, a relationship can be formed between the book and the patron's borrowing record. A book item cannot simultaneously be associated with two borrowing records. In examples, the count of nodes at the :N end can include all positive integers, all non-negative integers, or some subset of non-negative integers.

1:N relationships are commonly found within an object hierarchy, in which 1 parent can have N children. However, independent instantiation of such relationships is usually unnecessary, since these relationships are automatically created as part of adding a new instance of the child node. However, 1:N relationships can also be found between global nodes and nodes of a hierarchy, or between nodes of two hierarchies. These relationships can be added in conjunction with adding a child instance according to use case U2 or U3. With reference to FIG. 16, for example, a new Company 1610 can be formed as a child of a Country 1601 node, and may initially not be associated with a credit control area 1615. Thus, after creation of the new company 1610, it can be required to add a relationship between the new company 1610 and a credit control area 1615. Alternatively, an existing company's 1610 credit control area 1615 could be changed, which be implemented by replacement of an old relationship with a newly instantiated relationship. Examples of this use case are discussed in the context of FIG. 15.

In examples, the target set S1 for use case U4 contains two pairs P11 and P12, each containing a key multiset and a set of non-key fields. The multiset of P11 can be the field corresponding to the node at the :N side of the 1:N relationship, while the multiset of P12 can incorporate fields corresponding to both nodes joined by the 1:N relationship. The non-key field sets can include the complements of the members in the multiset. Thus, for a 1:N relationship from X (on the 1: side) to Y (on the :N side), S1={P11; P12}={((Y), {X}); ((X, Y), { })}. The target set S2 contains the same fields included in S1, thus {X, Y}. If either X or Y is a logical node, it can be replaced by its constituent instantiated nodes. For example, if X were node C1 described above for use case U3, X would be replaced by "G1, G2, P" in both S1 and S2.

The prime node PN for use case U4 is the node on the :N side of the 1:N relationship.

U5. Adding an Instance of an N:N Relationship Between Nodes.

In an N:N relationship (sometimes "N-to-N"), neither node is special to the node at the other end; an additional node can be readily added to either end of the N:N relationship. N:N relationships are non-hierarchical associations. In examples, the count of nodes at each end can independently should be augmented, while "F" means that augmentation is not needed. The symbols use short codes as indicated in FIG. 16, such as PLT for plant 1630, throughout.

TABLE I

| Column 1 | 2<br>Node or<br>Edge | 3<br>Target Set<br>S1 | 4<br>Target Set<br>S2 | 5<br>Key Multiset<br>M3 | 6<br>Non-Key<br>Field Set<br>S4 | 7<br>Augment ? |
|---|---|---|---|---|---|---|
| Use Case | | | | | | |
| U1<br>Root | DIV | {(DIV)} | {DIV} | (DIV)<br>(DIV)<br>(SOR, DIV) | { }<br>{DIV}<br>{ } | T<br>T<br>F |
| U2<br>Instantiated<br>Child of<br>Parent | SOR<br>(parent<br>is CCD) | {(SOR),<br>(SOR, CCD)} | {SOR, CCD} | (SOR)<br>(SOR, CCD)<br>(SOR, DIV)<br>(SOR)<br>(SOR, SOR) | { }<br>{CCD}<br>{ }<br>{DIV}<br>{ } | T<br>T<br>F<br>F<br>F |
| U3<br>Logical<br>Child | SLA<br>(comb.<br>of SOR<br>DCHL<br>DIV) | {(SOR, DCHL,<br>DIV),<br>(SOR, DIV)} | {SOR, DCHL, DIV} | (SOR, DCHL,<br>DIV)<br>(SOR, DIV)<br>(SOR, DIV)<br>(SOR, DCHL,<br>DIV)<br>(SOR, DCHL) | { }<br>{ }<br>{DIV}<br>{SOF}<br>{ } | T<br>T<br>T<br>F<br>F |
| U4<br>1:N<br>Relationship | CCA to<br>CCD | {Pair((CCD), {CCA});<br>Pair((CCD, CCA),<br>{ })} | {CCD, CCA} | (CCD)<br>(CCD)<br>(CCD)<br>(CCA)<br>(CCD, CCA)<br>(CCD, CCA) | {CCA}<br>{CCD, CCA}<br>{ }<br>{CCA}<br>{CCA}<br>{ } | T<br>T<br>F<br>F<br>T<br>T |
| U5<br>N:N<br>Relationship | DCHN to<br>PLT | {(SOR, DCHL,<br>PLT)} | {SOR, DCHL, PLT} | (SOR, DCHL,<br>PLT)<br>(SOR, DCHL,<br>PLT)<br>(SOR, DCHL,<br>PLT)<br>(SOR, DCHL)<br>(SOR, DCHL,<br>DIV) | { }<br>{PLT}<br>{SOF}<br>{ }<br>{ } | T<br>T<br>F<br>F<br>F | include all positive integers, all non-negative integers, or some subset of non-negative integers, but cannot be restricted to 1 or 0,1. Thus N:N can include the 0,N:N and N:0,N cases, as well as 0,N:0,N. With reference to FIG. 10, the relationship between a macroscopic attribute 1025 and a specimen 1020 is shown as N:N, and could be 0,N;0,N in examples. Examples of this use case are discussed in the context of FIG. 13.

In examples, the target set S1 for use case U5 contains exactly one multiset, which is determined by taking the fields corresponding to nodes joined by the to-be-instantiated edge. The target set S2 contains the same two fields. Thus, for an edge joining nodes A and B, target set S1={ (A, B)} and target set S2={A, B}. If either A or B is a logical node, it can be replaced by its constituent instantiated nodes. For example, if A were node C1 described above for use case U3, A would be replaced by "G1, G2, P" in both S1 and S2.

The prime node PN for use case U5 can be either of the related nodes.

Further Examples from FIG. 16

Table I shows further examples of disclosed technologies, as applied the database environment depicted in FIG. 16, organized by use case as shown in column 1. The node or edge to be instantiated is shown in column 2. Target sets S1 and S2 are shown in columns 3 and 4. In columns 5-7, various examples of database tables are considered. The tables themselves are omitted for brevity. Columns 5 and 6 show the key multiset M3 non-key field set S4 for each example table. Finally, the result of applying use-case-dependent rules to candidate tables' parameters M3 and S4, with reference to target parameters S1 and S2, are presented in column 7. A "T" means that the database table can or The examples of Table I will be understandable in light of other examples previously described and are not explained in detail.

With regard to use case U3, sales area SLA 1642 is a logical node which is a combination of Division DIV 1645, Distribution Channel DCHL 1635, and Sales Organization SOR 1622, because the parent of SLA 1642 is Distribution Chain DCHN 1632, which is itself a combination node. Furthermore, in column 3, the expanded target set S1 has been used, analogous to S1+ shown in FIG. 11B.

Further Example Variations

1. Customization Per Element or Database Table

The disclosed technologies can determine the database tables which can be augmented, and can either augment the table, and/or mark them ("A," or "relevant") for future instantiations of a given graph node or edge. Often, this is the desired determination, because it can be desired to augment as many database tables as is reasonable.

However, situations can arise where a particular database table can be augmented but should not be augmented for external considerations. One such reason can be that the new entry would match an existing entry in all key fields, which is disallowed because the values of key fields can uniquely specify a record in the database table.

To handle such situations, the processes described herein can be customized to check for exceptions, and/or manage such exceptions on the basis of (i) element to be instantiated, and/or (ii) database table to be augmented.

2. Customization Per Use Case or Element

Furthermore, the disclosed technologies can be customized for particular use cases or elements to be spawned. An example of this has been presented herein in the context of use case U3 and FIG. 11, where target set S1 can be extended by inclusion of a second multiset to form S1+. Such and other extensions can be performed on a use case basis or on an element (node or edge) basis.

Additionally, the structure of a database graph can be such that some use cases never occur, or are known a priori to occur infrequently enough that they can be excluded from the methods described herein, and handled by other means if necessary.

3. Fields Associated with Graph Edges

In some examples, fields represent or are represented by nodes of a database graph. In some examples, fields can represent edges or relationships in a database graph. In an illustration, an edge E joins nodes A and B, and the disclosed technologies can be adapted to a field associated with edge E by treating E as a combination of the fields for nodes A, B.

4. Copy Control Store

The prescribed procedures can be used to build a copy control store which can be referenced and used directly each time a new instance (a copy) is requested, rather than having to repeatedly run the prescribed procedures each time a new instance is requested. Then, each time a node or edge instantiation is requested, the configuration tables that need to be extended are determined from the copy control store, and extended accordingly. In some examples, the copy control store is built when the database environment is initially configured and launched, while in other examples the copy control store is built on a "lazy" basis: the appropriate prescribed procedure is used the first time a particular node or edge is sought to be spawned; the results of the prescribed procedure are added to the copy control store. In examples, the copy control store can be updated or reset when the graph is changed beyond simply changing numbers of instances of nodes and/or edges.

In examples, all or part of the copy control store can be distributed among or stored alongside the configuration tables themselves. For example, metadata of each configuration table can store a set of trigger nodes or edges for that configuration table. When a trigger node or edge of a given configuration table is sought to be instantiated, then the configuration table can be extended. When a node or edge that is not a trigger node or edge is sought to be spawned, then the configuration table need not be extended.

A Generalized Computer Environment

Figure 17:
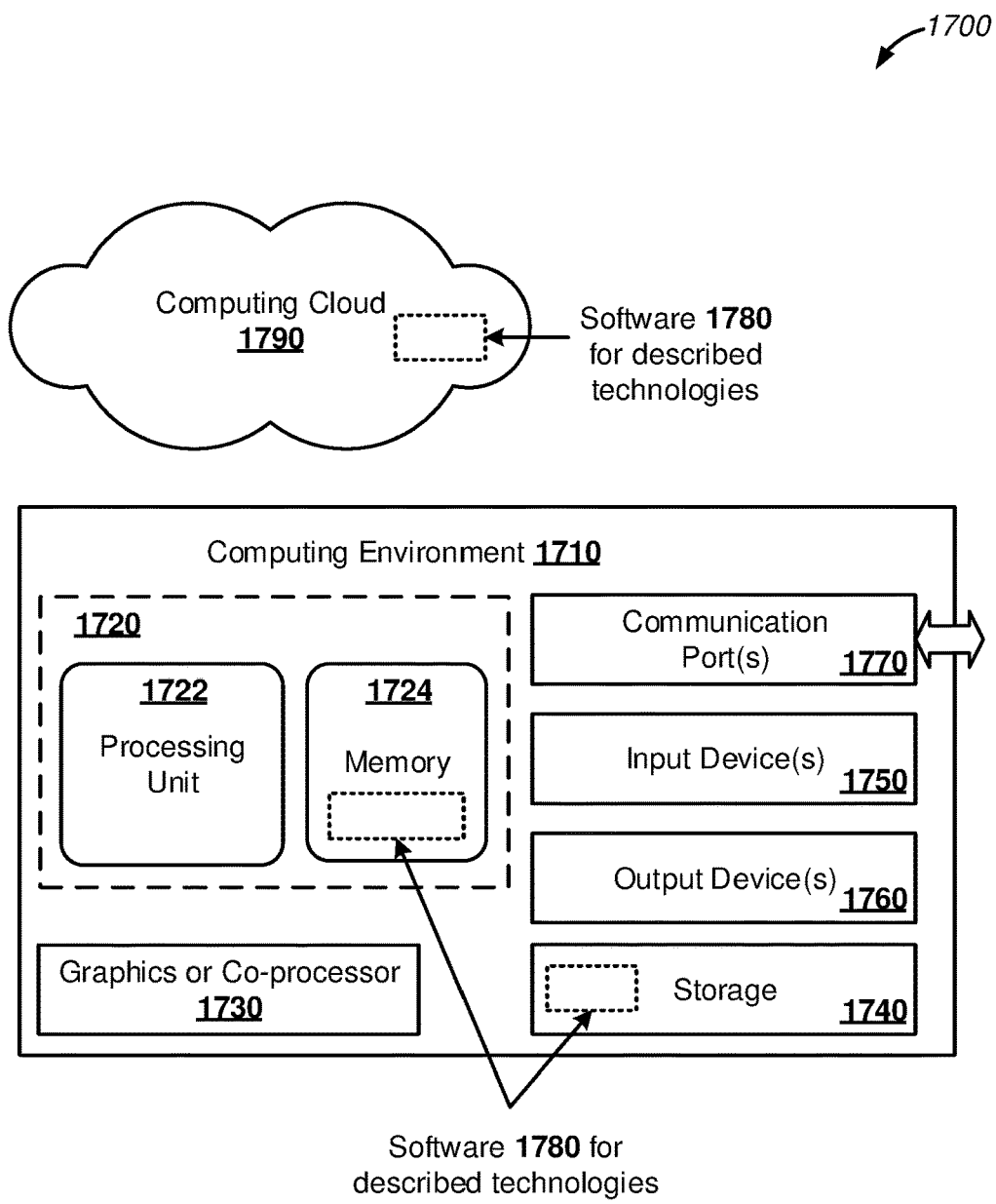
FIG. 17 is a diagram schematically depicting a computing environment suitable for implementation of disclosed technologies.

FIG. 17 illustrates a generalized example of a suitable computing system 1700 in which described examples, techniques, and technologies, including construction, deployment, operation, and maintenance of a dynamic form, can be implemented. The computing system 1700 is not intended to suggest any limitation as to scope of use or functionality of the present disclosure, as the innovations can be implemented in diverse general-purpose or special-purpose computing systems.

With reference to FIG. 17, computing environment 1710 includes one or more processing units 1722 and memory 1724. In FIG. 17, this basic configuration 1720 is included within a dashed line. Processing unit 1722 executes computer-executable instructions, such as for implementing any of the process blocks described above, and various other architectures, components, handlers, managers, modules, and repositories described herein. Processing unit 1722 can be a general-purpose central processing unit (CPU), processor in an application-specific integrated circuit (ASIC), or any other type of processor. In a multi-processing system, multiple processing units execute computer-executable instructions to increase processing power. Computing environment 1710 can also include a graphics processing unit or co-processing unit 1730. Tangible memory 1724 can be volatile memory (e.g., registers, cache, or RAM), non-volatile memory (e.g., ROM, EEPROM, or flash memory), or some combination thereof, accessible by processing units 1722, 1730. The memory 1724 stores software 1780 implementing one or more innovations described herein, in the form of computer-executable instructions suitable for execution by the processing unit(s) 1722, 1730. The memory 1724 can also store database data. The memory 1724 can also store some or all of configuration and operational data for the described innovations, or copies or representations of the components of a database graph which the described innovations are operating on.

A computing system 1710 can have additional features, such as one or more of storage 1740, input devices 1750, output devices 1760, or communication ports 1770. An interconnection mechanism (not shown) such as a bus, controller, or network interconnects the components of the computing environment 1710. Typically, operating system software (not shown) provides an operating environment for other software executing in the computing environment 1710, and coordinates activities of the components of the computing environment 1710.

The tangible storage 1740 can be removable or non-removable, and includes magnetic disks, magnetic tapes or cassettes, CD-ROMs, DVDs, or any other medium which can be used to store information in a non-transitory way and which can be accessed within the computing environment 1710. The storage 1740 stores instructions of the software 1780 (including instructions and/or data) implementing one or more innovations described herein.

The input device(s) 1750 can be a mechanical, touch-sensing, or proximity-sensing input device such as a keyboard, mouse, pen, touchscreen, or trackball, a voice input device, a scanning device, or another device that provides input to the computing environment 1710. The output device(s) 1760 can be a display, printer, speaker, optical disk writer, or another device that provides output from the computing environment 1710.

The communication port(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1700 can also include a computing cloud 1790 in which instructions implementing all or a portion of the disclosed technology are executed. Any combination of memory 1724, storage 1740, and computing cloud 1790 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein.

An Example Cloud Computing Environment

Figure 18:
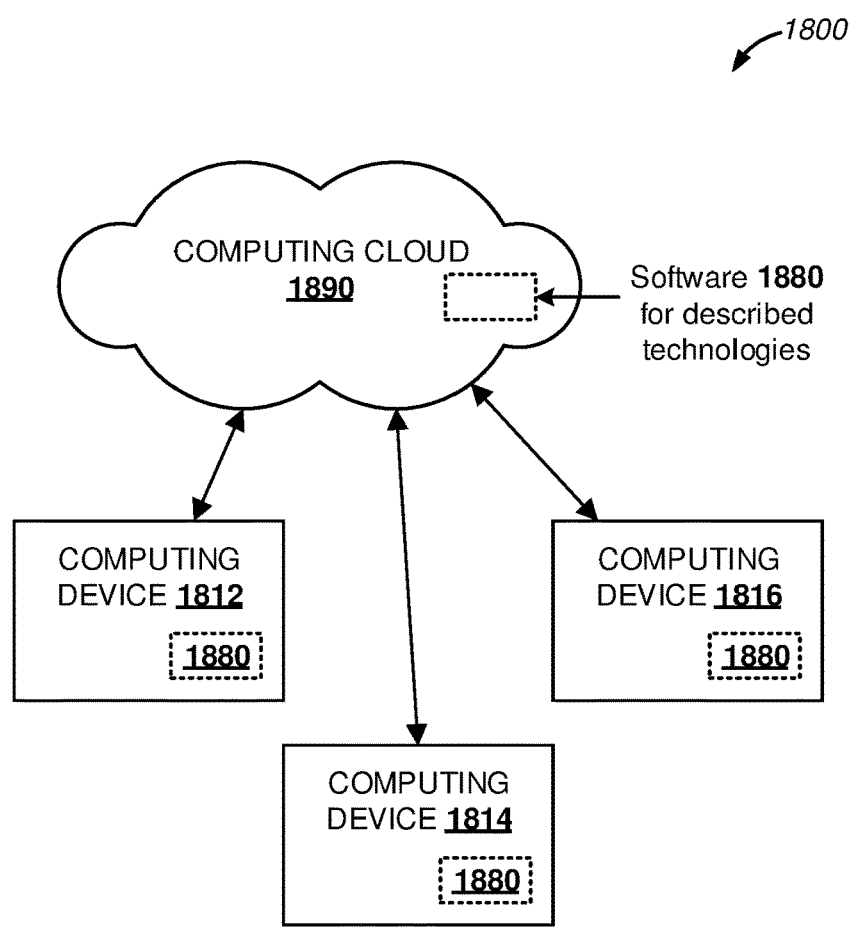
FIG. 18 is a diagram schematically depicting computing devices operating in conjunction with a computing cloud for implementation of disclosed technologies.

FIG. 18 depicts an example cloud computing environment 1800 in which the described technologies can be implemented. The cloud computing environment 1800 comprises a computing cloud 1890 containing resources and providing services. The computing cloud 1890 can comprise various types of cloud computing resources, such as computer servers, data storage repositories, networking resources, and so forth. The computing cloud 1890 can be centrally located (e.g., provided by a data center of a business or organization) or distributed (e.g., provided by various computing resources located at different locations, such as different data centers and/or located in different cities or countries).

The computing cloud 1890 can be operatively connected to various types of computing devices (e.g., client computing devices), such as computing devices 1812, 1814, and 1816, and can provide a range of computing services thereto. One or more of computing devices 1812, 1814, and 1816 can be computers (e.g., server, virtual machine, embedded systems, desktop, or laptop computers), mobile devices (e.g., tablet computers, smart phones, or wearable appliances), or other types of computing devices. Connections between computing cloud 1890 and computing devices 1812, 1814, and 1816 can be over wired, wireless, and optical links, or any combination thereof, and can be short-lived or long-lasting. These connections can be stationary or can move over time, being implemented over varying paths and having varying attachment points at each end. Computing devices 1812, 1814, and 1816 can also be connected to each other.

Computing devices 1812, 1814, and 1816 can utilize the computing cloud 1890 to obtain computing services and perform computing operations (e.g., data processing, data storage, and the like). Particularly, software 1880 for performing the described innovative technologies can be resident or executed in the computing cloud 1890, in computing devices 1812, 1814, and 1816, or in a distributed combination of cloud and computing devices.

General Considerations

As used in this application, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "analyze," "apply," "determine," "display," "estimate," "generate," "produce," and "use" to computer operations in a computer system. These terms are high-level descriptions of the actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smart phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1724, and storage 1740. The term computer-readable storage media does not include signals and carrier waves. In addition, the term computer-readable storage media does not include communication ports (e.g., 1770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed features can be applied, it should be recognized that the illustrated embodiments are only preferred examples and should not be taken as limiting the scope of the invention. Rather, the scope of the invention is defined by the following claims. We therefore claim as our invention all that comes within the scope and spirit of these claims.

We claim:

1. One or more computer-readable media storing instructions which, when executed by one or more processors, cause performance of a method of augmenting a relational database environment that is partly described by a database structure graph, wherein nodes of the database structure graph represent fields of the relational database environment and edges of the database structure graph represent associations or hierarchical relationships between respective pairs of fields, the method comprising:

receiving a command to spawn a new instance of an existing node among the nodes of the database structure graph;

based on a classification of the existing node, obtaining a first target set of one or more key field multisets and a second target set of one or more non-key fields; and responsive to determining that a complete key field multiset of a first database table of the relational database environment is a member of the first target set and that a complete set of non-key fields of the first database table is a subset of the second target set, selecting the first database table for augmentation; and augmenting the first database table with an augmentation entry for the new instance of the existing node of the database structure graph.

2. The one or more computer-readable media of claim 1, wherein the method further comprises:

classifying the existing graph node as a root node; and based on the classifying:

obtaining the first target set comprising a singleton key field corresponding to the existing graph node; and obtaining the second target set comprising a field corresponding to the existing graph node.

3. The one or more computer-readable media of claim 1, wherein the method further comprises:

classifying the existing graph node as a child node of an existing parent node; and based on the classifying:

obtaining the first target set comprising a singleton key field corresponding to the existing graph node and a two-member multiset of key fields corresponding to the existing graph node and to the existing parent node; and obtaining the second target set comprising fields corresponding to the existing graph node and to the existing parent node.

4. The one or more computer-readable media of claim 3, wherein the first target set consists of (i) the singleton key field corresponding to the existing graph node and (ii) the two-member multiset of key fields corresponding to the existing graph node and to the existing parent node.

5. The one or more computer-readable media of claim 3, wherein the second target set consists of the fields corresponding to the existing graph node and to the existing parent node.

6. The one or more computer-readable media of claim 1, wherein the method further comprises:

classifying the existing graph node as a combination node of an existing parent node and a second node; and based on the classifying:

obtaining the first target set comprising a couple of key fields corresponding to the existing parent node and to the second node; and obtaining the second target set comprising fields corresponding to the existing parent node and to the second node.

7. The one or more computer-readable media of claim 1, wherein the method further comprises:

classifying the existing graph node as a combination node of an existing grandparent node, a second node, and a third node; and based on the classifying:

obtaining the first target set comprising a triple of key fields corresponding to the existing grandparent node, to the second node, and to the third node; and obtaining the second target set comprising fields corresponding to the existing grandparent node, to the second node, and to the third node.

8. The one or more computer-readable media of claim 1, wherein the method further comprises:
for each of a third set of a plurality of database tables of the relational database environment, determining at least one of:
a corresponding complete key field multiset; or
a corresponding complete set of non-key fields;
wherein the third set includes the first database table.

9. The one or more computer-readable media of claim 8, wherein the method further comprises:
determining whether the corresponding complete key field multiset is a member of the first target set and/or the corresponding complete set of non-key fields is a subset of the second target set.

10. The one or more computer-readable media of claim 8, wherein the method further comprises:
choosing between augmenting and not augmenting a second database table distinct from the first database table, by:
determining that one or more of:
the corresponding complete key field multiset is not a member of the first target set; or
the corresponding complete set of non-key fields is not a subset of the second target set; and
responsive to the determining, choosing to not augment the second database table with a new entry for the new instance of the existing graph node.

11. The one or more computer-readable media of claim 8, wherein the third set of database tables comprises configuration tables of the relational database environment.

12. The one or more computer-readable media of claim 1, wherein the complete key field multiset of the first database table and the complete set of non-key fields of the first database table are restricted to fields corresponding to nodes of a graph on which the relational database environment is based.

13. One or more computer-readable media storing instructions which, when executed by one or more processors, cause performance of a method of augmenting a relational database environment that is partly described by a database structure graph, wherein nodes of the database structure graph represent fields of the relational database environment and edges of the database structure graph represent associations or hierarchical relationships between respective pairs of fields, the method comprising:
receiving a command to spawn a new instance of an existing edge among the edges of the database structure graph;
based on a classification of the existing edge, obtaining a first target set comprising at least one key field multiset and a second target set of non-key fields; and
responsive at least partially to determining that a complete key field multiset of a first database table of the relational database environment satisfies a condition relative to the first target set and that a complete set of non-key fields of the first database table is a subset of the second target set, selecting the first database table for augmentation; and
augmenting the first database table with an augmentation entry for the new instance of the existing edge of the database structure graph.

14. The one or more computer-readable media of claim 13, wherein the method further comprises:
classifying the existing graph edge as an N:N relationship joining a first node and a second node; and
based on the classifying:
obtaining the first target set comprising a couple of key fields corresponding to the first node and to the second node; and
obtaining the second target set comprising fields corresponding to the first node and to the second node.

15. The one or more computer-readable media of claim 14, wherein the condition comprises that the complete key field multiset of the first database table is a member of the first target set.

16. The one or more computer-readable media of claim 14, wherein the condition comprises that there exists a pair of the first target set having a multiset member that is the complete key field multiset of the first database table and having a set member that is a subset of the complete set of non-key fields of the first database table.

17. The one or more computer-readable media of claim 13, wherein the method further comprises:
classifying the existing graph edge as joining a first node on a 1 side and a second node on an N side of a 1:N relationship; and
based on the classifying:
obtaining the first target set as a set of a first pair and a second pair, wherein:
the first pair comprises a singleton key field corresponding to the second node and a non-key field set comprising the first node; and
the second pair comprises a couple of key fields corresponding to the first node and to the second node, and an empty set; and
obtaining the second target set comprising fields corresponding to the first node and to the second node.

18. The one or more computer-readable media of claim 13, wherein the method further comprises:
for each of a third set of a plurality of database tables of the relational database environment, determining at least one of:
a corresponding complete key field multiset; and
a corresponding complete set of non-key fields; and
determining whether the corresponding complete key field multiset satisfies the condition relative to the first target set and/or the corresponding complete set of non-key fields is a subset of the second target set;
wherein the third set includes the first database table.

19. The one or more computer-readable media of claim 13, wherein the method further comprises:
choosing between augmenting and not augmenting a second database table distinct from the first database table, by:
determining that one or more of:
the corresponding complete key field multiset does not satisfy the condition relative to the first target set; or
the corresponding complete set of non-key fields is not a subset of the second target set;
responsive to the determining, choosing to not augment the second database table with a new entry for the new instance of the existing graph edge.

20. A method of augmenting a relational database that is partly described by a database structure graph, wherein nodes of the database structure graph represent fields of the relational database and edges of the database structure graph represent associations or hierarchical relationships between pairs of fields, the method comprising:

at a computer comprising a processor and memory attached thereto:
  receiving a request to spawn a new instance of an existing node among the nodes of the database structure graph;
  based on a classification of the existing node:
    determining a first target set of key field multisets consisting of (i) a singleton multiset corresponding to the existing database structure graph node, or (ii) the singleton corresponding to the existing database structure graph node and a two-member multiset corresponding to the existing database structure graph node and to a parent node of the existing database structure graph node; and
    determining a second target set of non-key fields consisting of (iii) a field corresponding to the existing database structure graph node, or (iv) the field corresponding to the existing database structure graph node and a field corresponding to the parent node;
  for each of a third set of a plurality of database tables of the relational database environment:
    determining at least one of:
      a complete key field multiset of the database table; or
      a complete set of non-key fields of the database table;
    determining whether the complete key field multiset of the database table is a member of the first target set and/or the complete set of non-key fields of the database table is a subset of the second target set;
    based on determining whether the complete key field multiset is a member of the first target set and the complete set of non-key fields is a subset of the second target set, switching between (i) augmenting the database table with a new entry for the new instance of the existing database structure graph node and (ii) not augmenting the database table with a new entry for the new instance of the existing database structure graph node;
  wherein the relational database is based on a database structure graph comprising a plurality of nodes connected by edges, and the complete key field multiset and the complete set of non-key fields are restricted to fields corresponding to nodes of the database structure graph.

* * * * *